(12) United States Patent
Kamikawa et al.

(10) Patent No.: US 8,505,472 B2
(45) Date of Patent: Aug. 13, 2013

(54) PULVERIZED COAL-FIRED BOILER AND PULVERIZED COAL BURNING METHOD

(75) Inventors: Yuki Kamikawa, Hitachinaka (JP);
Masayuki Taniguchi, Hitachinaka (JP);
Hisayuki Orita, Hitachinaka (JP);
Hironobu Kobayashi, Hitachi (JP);
Akira Baba, Kure (JP); Toshihiko Mine, Kure (JP); Shinichirou Nomura, Kure (JP); Noriyuki Ooyatsu, Kure (JP); Satoshi Tadakuma, Kure (JP); Hidehisa Yoshizako, Kure (JP); Hiroaki Kanemoto, Kure (JP); Kouji Kuramashi, Kure (JP); Akihito Orii, Hitachi (JP); Shinji Tsuda, Hitachi (JP); Hirofumi Okazaki, Hiroshima (JP); Takanori Yano, Kumano (JP); Katsumi Shimohira, Kure (JP)

(73) Assignee: Babcock-Hitachi K.K., Tokyo (JP)

( * ) Notice: Subject to any disclaimer, the term of this patent is extended or adjusted under 35 U.S.C. 154(b) by 1340 days.

(21) Appl. No.: 12/160,492

(22) PCT Filed: Jan. 10, 2007

(86) PCT No.: PCT/JP2007/050132
§ 371 (c)(1),
(2), (4) Date: Jul. 10, 2008

(87) PCT Pub. No.: WO2007/080873
PCT Pub. Date: Jul. 19, 2007

(65) Prior Publication Data
US 2010/0224108 A1    Sep. 9, 2010

(30) Foreign Application Priority Data

Jan. 11, 2006   (JP) .................................. 2006-003515

(51) Int. Cl.
*F23D 1/00*      (2006.01)
*F23N 5/18*      (2006.01)

(52) U.S. Cl.
USPC ........................... 110/347; 110/263; 110/188

(58) Field of Classification Search
USPC ................. 110/262, 265, 106, 160, 157, 346, 110/208, 342, 344, 345, 203, 210, 211, 214; 431/10; 29/890.051
See application file for complete search history.

(56) References Cited

U.S. PATENT DOCUMENTS 4,520,739 A * 6/1985 McCartney et al. .......... 110/263
4,655,148 A * 4/1987 Winship ........................ 110/347

(Continued)

FOREIGN PATENT DOCUMENTS

JP          58-224205         12/1983
JP          62134405       *  6/1987

(Continued)

*Primary Examiner* — Khoa Huynh
*Assistant Examiner* — Timothy K Trieu
(74) *Attorney, Agent, or Firm* — Mattingly & Malur, PC

(57) ABSTRACT

A pulverized coal-fired boiler efficiently supplies air to a central part of a furnace and the neighborhood of a furnace wall, thereby promoting mixture with combustion gas, and reducing both NOx and CO.

The main after air ports are structured so as to jet air having a large momentum for enabling arrival at the central part of the furnace, and the sub-after air ports are structured so as to jet air having a small momentum to the neighborhood of the wall face of the furnace, and a sectional center of each of the sub-after air ports is within a range from 1 to 5 times of a caliber of the main after air ports from a sectional center of each of the main after air ports.

2 Claims, 29 Drawing Sheets

(56) References Cited

U.S. PATENT DOCUMENTS

| | | | |
|---|---|---|---|
| 5,020,454 A * | 6/1991 | Hellewell et al. | 110/264 |
| 5,040,470 A * | 8/1991 | Lofton et al. | 110/234 |
| 6,164,956 A * | 12/2000 | Payne et al. | 431/3 |
| 6,325,003 B1 * | 12/2001 | Ashworth et al. | 110/345 |
| 6,485,289 B1 * | 11/2002 | Kelly et al. | 431/4 |
| 7,392,752 B2 * | 7/2008 | Okazaki et al. | 110/204 |
| 7,661,376 B2 * | 2/2010 | Saviharju et al. | 110/348 |
| 7,681,508 B2 * | 3/2010 | Taniguchi et al. | 110/214 |
| 7,922,480 B2 * | 4/2011 | Kiyama et al. | 431/10 |
| 2002/0066395 A1 * | 6/2002 | Yamamoto et al. | 110/345 |
| 2003/0091948 A1 * | 5/2003 | Bool et al. | 431/10 |
| 2004/0221777 A1 * | 11/2004 | Hart et al. | 110/213 |

FOREIGN PATENT DOCUMENTS

| | | | |
|---|---|---|---|
| JP | 1-150707 | | 6/1989 |
| JP | 1-167514 | | 7/1989 |
| JP | 5-018510 | | 1/1993 |
| JP | 05018510 | * | 1/1993 |
| JP | 9-126414 | | 5/1997 |
| JP | 9-126415 | | 5/1997 |
| JP | 9-310807 | | 12/1997 |
| JP | 09310807 | * | 12/1997 |
| JP | 10-122546 | * | 5/1998 |
| JP | 11-304109 | | 11/1999 |
| JP | 11304109 | * | 11/1999 |
| JP | 2002-243112 | | 8/2002 |
| JP | 2002243112 | * | 8/2002 |
| WO | WO/02081971 | * | 10/2002 |

* cited by examiner

FLOW LATE RATIO (%)
OF MAIN AFTER AIR PORTS (1) ONE SUB-AFTER AIR PORT ARRANGED BETWEEN MAIN AFTER AIR PORTS (2) A PLURALITY OF SUB-AFTER AIR PORTS ARRANGED BETWEEN MAIN AFTER AIR PORTS

→ JET FROM MAIN AFTER AIR PORTS

⇒ JET FROM SUB-AFTER AIR PORTS

PULVERIZED COAL-FIRED BOILER AND PULVERIZED COAL BURNING METHOD

TECHNICAL FIELD

The present invention relates to a pulverized coal-fired boiler and a pulverized coal burning method.

BACKGROUND ART

A pulverized coal-fired boiler is requested for a reduction in nitrogen oxide (NOx) concentration and to respond to this request, the double burning method is applied. This is a method for burning fuel in the state of insufficient air and then supplying air for complete combustion from an after air port.

For the after air port, to improve the air mixture and burning condition, several structures are proposed. As one of them, an after air port composed of main after air ports and sub-after air ports in which the sub-after air ports are arranged between the main after air ports is known (for example, refer to Patent Documents 1 and 2).

Further, an art for arranging two-stage after air ports on the upstream side and down stream side and controlling the air flow rate and jet direction is disclosed (for example, refer to Patent Documents 3 and 4).

Patent Document 1: Japanese Patent Laid-open No. Hei 5 (1993)-18510 (Abstract)

Patent Document 2: Japanese Patent Laid-open No. 2002-243112 (Abstract)

Patent Document 3: Japanese Patent Laid-open No. Hei 1 (1989)-150707

Patent Document 4: Japanese Patent Laid-open No. Hei 9 (1997)-126415

DISCLOSURE OF THE INVENTION

Problems to be Solved by the Invention

In Patent Documents 1 and 2, reduction in NOx and reduction in unburned components are described.

Particularly, in Japanese Patent Laid-open No. Hei 9(1997)-126415, the arrangement of the main after air ports and sub-after air ports for supplying after air to the pulverized coal-fired boiler is devised and the structure that the sub-after air ports are arranged on the upstream side of the main after air ports and at the just intermediate position between the neighboring main after air ports is disclosed.

In the arrangement structure of the after air port of the pulverized coal-fired boiler, unburned components in the furnace are mixed with sub-after air supplied from the sub-after air ports and carbon monoxide (CO) can be reduced in the oxidation region.

However, in the pulverized coal-fired boiler having the aforementioned structure, in correspondence with combustion of the unburned components in the furnace, the combustion temperature rises, so that a problem arises that the concentration of generated NOx increases suddenly.

An object of the present invention is to provide a pulverized coal-fired boiler for supplying efficiently air to the central part of a furnace and the neighborhood of the furnace wall, thereby promoting mixture with combustion gas, and reducing both NOx and CO.

Means for Solving the Problems

The present invention is characterized in that the main after air ports are structured so as to jet air having a large momentum for enabling arrival at the central part of the furnace, and the sub-after air ports are structured so as to jet air having a small momentum to the neighborhood of the wall face of the furnace, and the sectional center of each of the sub-after air ports is within the range from 1 to 5 times of the caliber of the main after air ports from the sectional center of each of the main after air ports.

Further, the present invention is characterized in that a plurality of main after air ports for supplying a large amount of air and a plurality of sub-after air ports for supplying a small amount of air are installed on the opposite wall faces of the furnace on the upstream side, and the sub-after air ports are arranged within the range from 1 to 5 times of the caliber of the main after air ports, and the momentum of air jetted from the main after air ports is made larger than the momentum of air jetted from the sub-after air ports.

EFFECTS OF THE INVENTION

According to the present invention, a pulverized coal-fired boiler for supplying efficiently air to the central part of the furnace and the neighborhood of the furnace wall, thereby promoting mixture with combustion gas, and reducing both NOx and CO can be provided.

LEGEND

Figure 1:
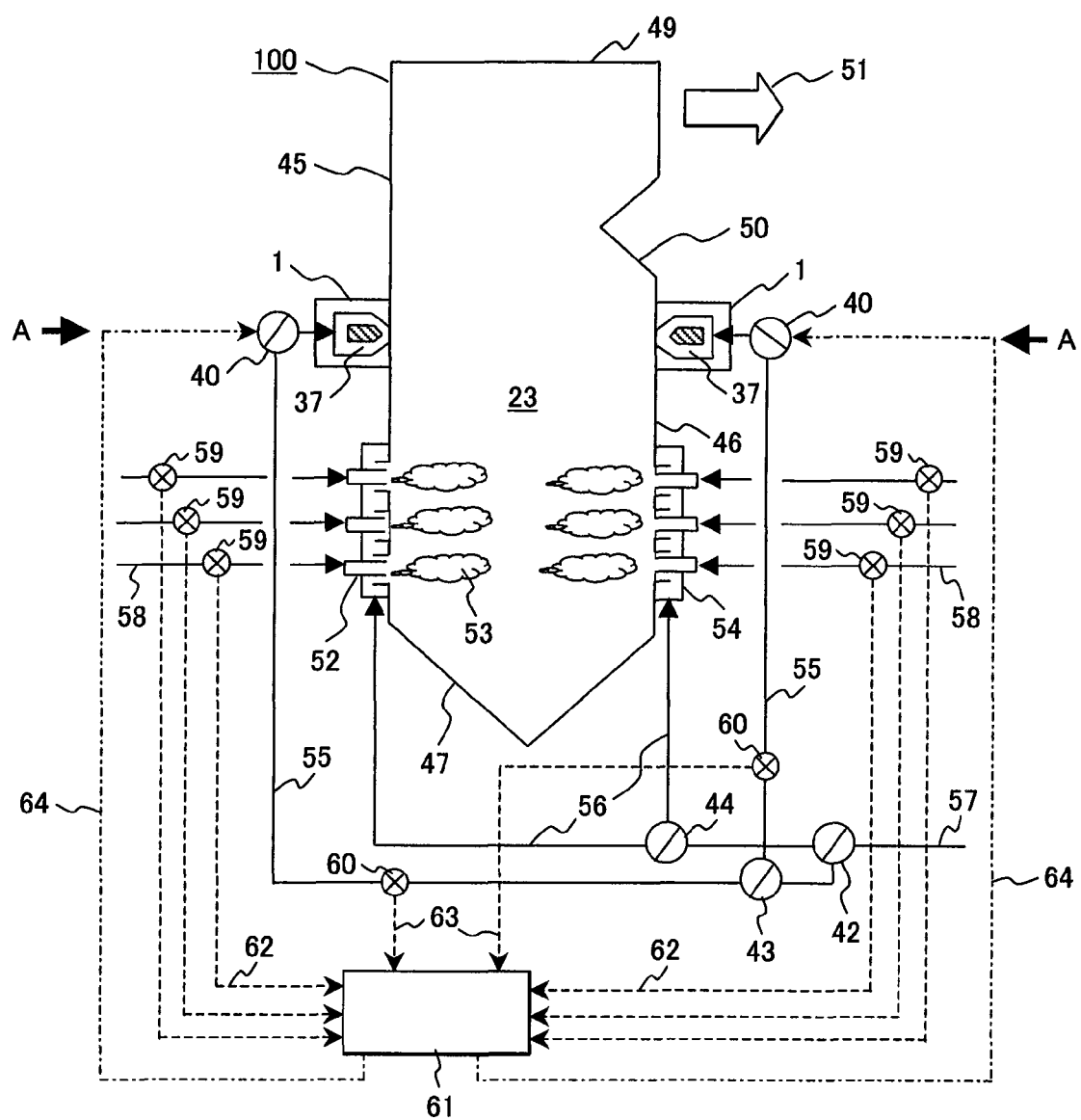
FIG. 1 is a schematic constitution of a pulverized coal-fired boiler and a supply system of air and pulverized coal thereof relating to a first embodiment of the present invention.

1: Outer cylinder of window box, 2: Vena contracta member, 3: Vena contracta, 4: Jet port, 5: Opening of window box, 7: Member for specifying minimum flow path area of vena contracta, 9: Support material of member for specifying minimum flow path area of vena contracta, 11: Slide ring, 13: Outer wall of window box, 23: Intra-furnace combustion space, 24: Damper, 26: Primary nozzle, 27: Secondary nozzle, 28: Tertiary nozzle, 37: Main after air port, 38: Sub-after air port, 39: Partition plate, 40: Main after air flow rate adjustment mechanism, 41: Sub-after air flow rate adjustment mechanism, 42: Air flow rate distribution adjustment mechanism, 43: Air flow rate distribution adjustment mechanism, 44: Air flow rate adjustment distribution mechanism, 45: Front wall of furnace, 46: Back wall of furnace, 48: Side wall of furnace, 49: Furnace ceiling, 50: Nozzle, 51: Gas after combustion, 52: Burner, 53: Flame of insufficient air, 54: Window box for burner, 55: After air, 57: Air for combustion, 59: Coaling amount detector, 60: Flow rate detector, 61: Controller, 63: After air flow rate, 100: Furnace Best Mode for Carrying Out the Invention The main after air ports having a vena contracta type structure for permitting jetted air to flow in the direction of the central axis of the after air port are very effective in simultaneously reducing NOx and CO. The sub-after air ports having a straight flow type structure for permitting jetted air to flow in parallel with the central axis of the after air port are effective in mixing combustion gas on the wall side, which cannot be mixed with air by the main after air ports, with air and reducing CO. Air jetted from the straight flow type sub-after air ports, since the flow speed from the furnace wall to the furnace center is attenuated quickly, air hardly reaches the central part of the furnace. Therefore, thermal NOx is not generated in the high temperature region at the center of the furnace, and mixture of gas on the wall side is promoted, and CO can be reduced. If the sub-after air ports are formed in the vena contracta type structure, the flow speed is hardly attenuated and thermal NOx is easily generated to permit air to reach the central part of the furnace.

Further, it is desirable to install a damper for controlling the air flow rate on the main after air ports or both the main after air ports and sub-after air ports. When a damper is installed, the air flow rate can be adjusted finely, so that the air supply is little varied and air can be mixed efficiently.

Further, it is desirable to install a partition plate in the window box and divide the air flow path of the main after air ports and the air flow path of the sub-after air ports. By doing this, the air flow rate can be adjusted for each main after air port and sub-after air port.

According to the present invention, it is desirable to install a controller for controlling the after air flow rate, decide the pulverized coal amount to be supplied to the burner of the front wall of the furnace and the burner of the back wall, and calculate the ratio of coal supply amount between the front wall and the back wall, on the basis of it, calculate the after air flow rate of the front wall and back wall, and decide the distribution of the air flow rate supplied to the main after air ports and sub-after air ports. Further, when there is a suspension burner on the front wall of the furnace or the back wall thereof, it is desirable to set the air flow rate to be supplied to the after air port having the suspension burner lower than the air flow rate to be supplied to the other after air port. By controlling the after air flow rate like this according to the operation condition of the burner, NOx and CO can be reduced effectively.

According to the present invention, the main after air ports are structured so as to jet air having a large momentum capable of reaching the central part of the furnace, and the sub-after air ports are structured so as to jet air having a small momentum to the neighborhood of the wall face of the furnace, and it is desirable to install the sub-after air ports so that the distance from the sectional center of the sub-after air ports to the sectional center of the main after air ports is set within range of 1 to 5 times of the caliber of the main after air ports.

When the sub-after air ports are arranged on the upstream side of the main after air ports, by supplying sub-after air from the sub-after air ports, combustion gas from the upstream side of the furnace is stagnated, that is, the rising flow speed of combustion gas in the neighborhood of the furnace wall is weakened. Therefore, main after air supplied from the main after air ports can be supplied to the center of the furnace without the flow thereof being disturbed by combustion gas in the neighborhood of the furnace wall.

Further, when the sub-after air ports are arranged on the downstream side of the main after air ports, combustion gas from the upstream side of the furnace is mixed with a jet of the main after air ports, though a part thereof slips through the main after air ports. The slipped unburned gas is stagnated on the downstream side of the main after air ports because the rising flow speed of unburned gas is weakened. Therefore, if sub-after air is supplied from the sub-after air ports in the stagnant region, mixture of combustion gas with air can be promoted in the neighborhood of the furnace wall.

Inversely, if the sub-after air ports are installed on the upstream side of the main after air ports so that the central position of the section of the sub-after air ports becomes a length 5 times or more of the caliber of the main after air ports, the stagnant effect by sub-after air and combustion gas cannot be obtained sufficiently. Further, if the sub-after air ports are installed on the downstream side of the main after air ports so that the central position of the section of the sub-after air ports becomes a length 5 times or more of the caliber of the main after air ports, sub-after air cannot be supplied to the stagnant region of main after air and combustion gas, so that the mixture is not promoted. Further, if the sub-after air ports are installed so that the central position of the section of the sub-after air ports becomes a length 1 times or less of the caliber of the main after air ports, sub-after air is rolled in main after air, so that the aforementioned effect cannot be obtained.

According to the present invention, it is desirable that the momentum of main after air supplied from the main after air ports is set within the range from 3 to 20 times of the momentum of sub-after air supplied from the sub-after air ports. If the momentum of main after air is smaller than 3 times of the momentum of sub-after air, the momentum of sub-after air is increased, so that air cannot be mixed efficiently with the unburned components in the neighborhood of the furnace wall. Further, the momentum of main after air is decreased, so that air cannot reach the central part of the furnace. On the other hand, if the momentum of main after air becomes larger than 20 times of the momentum of sub-after air, the momentum of sub-after air, particularly the flow rate is excessively low, so that air necessary for combustion of the unburned components in the neighborhood of the furnace wall cannot be supplied.

Further, according to the present invention, it is desirable that the main after air ports have a vena contracta that the outside diameter of the flow path is contracted toward the air jet port and the jetted air flows in the direction of the central axis of the main after air ports. By doing this, the momentum of main after air is increased, and a jet reaches the central part of the furnace, and the mixture is promoted, so that it is very effective in simultaneous reduction in NOx and CO.

Further, it is desirable that the sub-after air ports have a structure of enlarging toward the air jet port for jetting sub-after air into the furnace, are formed in a multi-tube structure on the concentric axis, jet a straight flow from the flow path at the center, and supply a rotational flow from the outer periphery thereof. If air jetted from the sub-after air ports flows in the parallel direction with the central axis of the after air port or a rotational flow is generated, combustion gas on the wall side which cannot be mixed with air by the main after air ports is mixed with air and it is effective in reducing CO. Air jetted from the sub-after air ports of the straight flow type or rotational type, since the flow speed from the furnace wall to the furnace center is attenuated quickly, hardly reaches the central part of the furnace. Therefore, without thermal NOx being generated in the high temperature region at the center of the furnace, the mixture of gas on the wall side is promoted and CO can be reduced.

Further, according to the present invention, if the main after air ports are structured so that jetted air flows in the direction of the central axis of the main after air ports and the sub-after air ports are structured so as to jet a straight flow in the parallel direction with the central axis of the sub-after air ports and jet a rotational flow from the outer periphery thereof, it is particularly effective in reduction in NOx and CO. By doing this, the momentum of main after air toward the enter of the furnace is increased, and not only air can be efficiently supplied to the furnace center but also sub-after air can be effectively mixed by rotation with the unburned components in the neighborhood of the wall.

Further, according to the present invention, it is desirable that the main after air ports and sub-after air ports are installed on the wall face of the furnace and are respectively arranged in the common window box to which after air is supplied from the outside. By doing this, the flow rate of after air can be controlled by one valve from the low flow rate (low load) to the high flow rate (high load). Particularly, the main after air ports have a structure having a vena contracta, and the sub-after air ports have a structure capable of supplying a rotational flow, and both have a high pressure loss, so that the air flow rate can be controlled easily. Furthermore, if the window box is shared, the structure is simplified and can be manufactured easily and when newly adding main or sub-after air ports, they can be installed easily.

Further, it is possible to pair up one main after air port and one sub-after air port, connect at least one set to the same window box, and install a plurality of window boxes on the wall face of the furnace side by side in one direction. By doing this, without changing the ratio of momentum between main after air and sub-after air, the flow rate of after air jetted at the central part of the furnace and the side wall of the furnace can be adjusted, so that the part having much combustion gas can be mixed efficiently with air.

Further, according to the present invention, assuming the distance between the downmost burner and the main after air ports as X and the distance between the main after air ports and the bottom of the heat exchanger arranged in the furnace on the downstream side of the main after air ports as Y, it is desirable to arrange the main after air ports within the range of $X/(X+Y)$ from 0.3 to 0.6. If the installation position of the main after air ports is $X/(X+Y)<0.3$, the reduction region is reduced, so that the NOx generation amount is increased. Further, if it is $X/(X+Y)>0.6$, the stay time after input of main and sub-after air is reduced, and the mixture is insufficient, so that the unburned components are increased.

Further, according to the present invention, it is desirable to arrange so that the caliber of the main after air ports on the side wall side of the furnace is smaller than that on the central side thereof. In the neighborhood of the central part of the furnace, the rising speed of unburned gas flowing from the upstream side of the furnace becomes particularly high. Therefore, if the caliber of the main after air ports on the side wall side is made smaller, the momentum of air supplied to the central part of the furnace becomes larger than that on the side wall side, so that the mixture with the unburned components remaining on the central part of the furnace is prompted.

Further, according to the present invention, the main after air ports and sub-after air ports are respectively arranged in the common window box which is installed on the wall face of the furnace and is supplied with after air from the outside and the after air supply duct for supplying after air is equipped with an air flow rate adjustment mechanism. And, it is desirable to arrange the air flow rate adjustment mechanism in the secondary and tertiary air supply ducts for supplying secondary and tertiary air for combustion to the burners so as to independently supply air to the burners. By doing this, under the condition that the ratio of air to be supplied to the after air port and air to be supplied to the burners is kept constant, the secondary and tertiary air flow rates of the burners can be adjusted finely and air can be supplied efficiently according to the burning condition of the burners. Therefore, NOx generated in the burner section can be always kept at its minimum and the main after air jetting condition can be kept so that the overall performance of NOx and CO is optimized.

Further, it is possible to pair up one main after air port and one sub-after air port, connect at least one set to the same window box, install a plurality of window boxes on the wall face of the furnace side by side in one direction, install the air flow rate adjustment mechanism on the after air supply duct for supplying after air, and arrange the air flow rate adjustment mechanism on the secondary and tertiary air supply ducts for supplying secondary and tertiary air for combustion to the burners so as to independently supply air to the burners. By doing this, the secondary and tertiary air flow rates of the burners can be adjusted finely, and furthermore, without changing the ratio of the momentum of main after air and sub-after air, the flow rates of after air jetted at the central part of the furnace and on the side wall of the furnace can be adjusted, so that in accordance with the burning condition of the burners, air can be supplied particularly efficiently.

Further, according to the present invention, it is desirable to install a pulverized coal flowmeter for measuring the pulverized coal amount of fuel conveyed to the plurality of burners in the flow path for conveying pulverized coal to the burners and a controller, on the basis of the pulverized coal amount measured by the pulverized coal flowmeter, for adjusting the secondary and tertiary air amounts for combustion to be supplied to the burners. If the pulverized coal flowmeter is installed, air can be supplied in accordance with the deviation of the pulverized coal supply amount. Furthermore, the controller is installed and the secondary and tertiary air flow rates of the burners are controlled according to the pulverized coal supply amount, thus NOx and CO can be reduced effectively.

Further, it is also possible to install a pulverized coal flowmeter for measuring the pulverized coal amount of fuel conveyed to the plurality of burners in the flow path for conveying pulverized coal to the burners and a controller, on the basis of the pulverized coal amount measured by the pulverized coal flowmeter, for adjusting the after air amounts to be supplied to the main and sub-after air ports. If the pulverized coal flowmeter is installed, air can be supplied in accordance with the deviation of the pulverized coal supply amount. Furthermore, the controller is installed and the after air flow rates are controlled according to the pulverized coal supply amount, thus NOx and CO can be reduced effectively.

According to the present invention, it is desirable to install a plurality of oxygen concentration detectors for detecting the oxygen concentration in the combustion space of the furnace and a controller for individually adjusting the air flow rates of a plurality of main after air ports and sub-after air ports on the basis of signals from the oxygen concentration detectors and control the air flow rate of the main after air ports and the air flow rate of the sub-after air ports on the basis of signals from the plurality of oxygen concentration detectors. When the oxygen concentration at the central part of the furnace is low, main after air is increased, so that the sub-after air amount is decreased, and when the oxygen concentration on the side wall of the furnace is low, the main after air amount is decreased so that sub-after air is increased. By doing this, with the burning condition of the burners kept constant, the air flow rate can be controlled, so that NOx generated at the burner section can be kept at its minimum.

Hereinafter, the embodiments of the present invention will be explained with reference to the accompanying drawings, though the present invention is not limited to the structure indicated below.

Embodiment 1

FIG. 1 is a schematic block diagram of the pulverized coal-fired boiler relating to a first embodiment of the present invention. The wall face of a furnace 100 is surrounded by an upper furnace ceiling 49, a lower hopper 47, a side furnace front wall 45, a furnace back wall 46, and a furnace side wall 48 (shown in FIG. 2) and on the respective wall faces, water tubes not drawn are arranged. By the water tubes, a part of the heat of combustion generated in a furnace combustion space 23 is absorbed. Combustion gas generated in the furnace combustion space 23 flows from underneath to above and is discharged as gas 51 after combustion. The gas 51 after combustion passes through a back heat transfer section not drawn and here, the heat included in the gas is collected furthermore.

On the lower part of the furnace, burners 52 are installed and flames 53 of insufficient air are formed here. A plurality of burners are generally installed on the front wall and back wall of the furnace so as to be opposite to each other. Coal is crushed to pieces of about 150 μm or less by a crusher not drawn and then is conveyed by air and primary air for the burners and pulverized coal 58 are jetted into the furnace from the burners 52. Secondary and tertiary air 56 for the burners is also jetted simultaneously from the burners 52 via window boxes (secondary and tertiary air supply ducts for the burners) 54 for the burners.

Above the burners, main after air ports 37 are installed. Sub-after air ports 38 (shown in FIG. 2) are installed at the same height as that of the main after air ports 37. A plurality of main and sub-after air ports are installed respectively on the front wall and back wall of the furnace. The structure of the main after air ports 37 is a vena contracta type structure that the air flow is directed in the direction of the central axis of the main after air ports in the neighborhood of the jet port. The detailed structure will be described later. The greater part of the unburned components such as CO generated from the flames 53 of insufficient air formed by the burner section is mixed with main after air, thereby is burned completely (oxidation). However, when the unburned components and main after air are mixed, NOx (mainly thermal NOx) is also generated. The generation amount of NOx is related to the flow speed of main after air (the maximum flow speed of the vena contracta) and the adjustment of the flow speed of main after air is important. Furthermore, if the jetting condition of main after air is set so as to lower NOx, the oxidation becomes insufficient, and CO is apt to be generated easily, so that in consideration of the performance balance of NOx and CO, the jetting condition of main after air must be set.

Air for combustion 57 is distributed to secondary and tertiary air 56 for the burners and after air 55 by an air flow rate distribution adjustment mechanism 42. The after air 55 is distributed to air flowing to the after air port on the front wall side and air flowing to the after air port on the back wall side by an air flow rate distribution adjustment mechanism 43. The air flow rates of the after air port on the front wall side and the after air port on the back wall side are controlled to the after air flow rate set value which is set by a controller 61 according to the position of the suspension burner. To the controller 61, a mill coaling amount 62 detected by a coaling amount detector 59 and an after air flow rate 63 detected by an after air flow rate detector 60 are input. The controller 61, when the suspension burner is positioned on the front wall side of the furnace, sets the after air flow rate set value on the front wall of the furnace to a low value on the basis of the mill coaling amount 62 and can adjust the after air flow rate 63.

On the upper part of the back wall 46 of the furnace, a nozzle 50 is often set. By the influence of the nozzle 50, the flow of combustion gas around the main after air ports 37 is unsymmetrical. The distribution of after air flowing on the front wall side and back wall side is adjusted, thus even in the unsymmetrical flow region, NOx and CO can be reduced.

The after air 55, furthermore, by a main after air flow rate adjustment mechanism 40 and a sub-after air flow rate adjustment mechanism 41, adjusts the air amounts supplied from the main and sub-after air. By doing this, the main after air jet flow speed (the maximum flow speed of the vena contracta) and the sub-after air jet flow speed can be adjusted. When the main after air jet flow speed is excessively high, the sub-after air amount is increased and when the jet flow speed is excessively low, it is decreased. The sub-after air is jetted from between the main after air ports, so that there exists excessive fuel in the furnace, and the mixture of gas of insufficient air with air is promoted, and CO can be reduced efficiently. On the other hand, the flow rate of the sub-after air is low, so that the influence on generation of NOx (thermal NOx) is little. Further, the main after air amount can be adjusted by use of sub-after air, so that the secondary and tertiary air flow rates supplied to the burners can be always kept constant. This means that the burning condition of the flames 53 of insufficient air formed by the burner section can be operated always under the optimum condition for minimizing the generation amount of NOx here.

As a result, NOx generated in the burner section can be always kept at its minimum and the main after air jetting condition can be kept so that the overall performance of NOx and CO is optimized.

Further, the secondary and tertiary air 56 supplied to the burners, similarly to the after air 55, is distributed to air flowed to the burner on the front wall side and air flowed to the burner on the back wall side by an air flow rate distribution adjustment mechanism 44.

Figure 2:
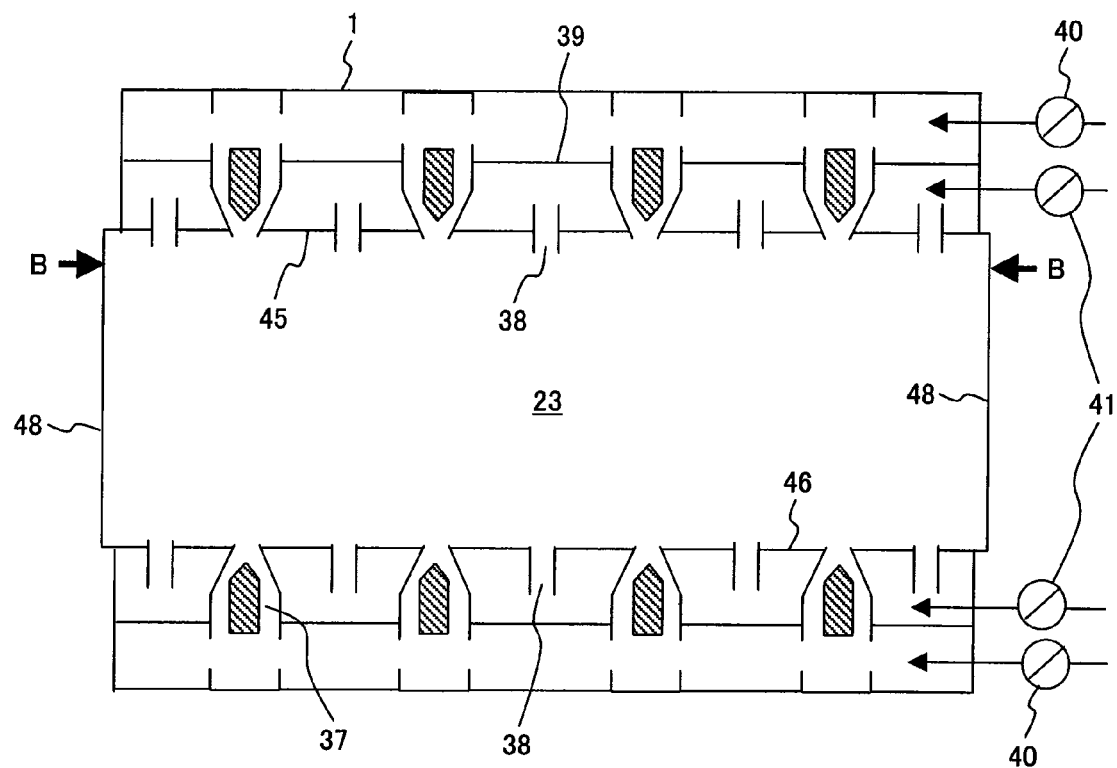
FIG. 2 is a cross sectional view of the line A-A shown in FIG. 1.
Figure 3:
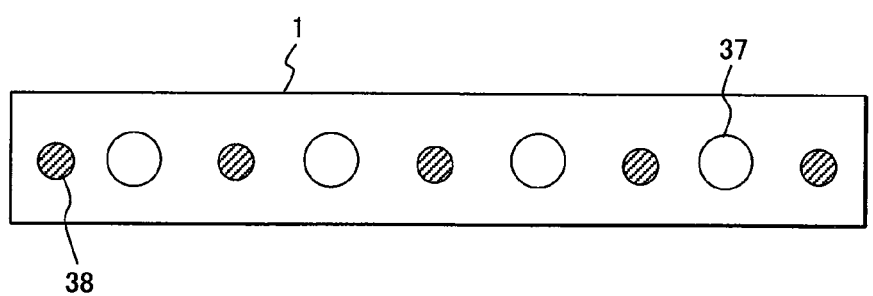
FIG. 3 is a cross sectional view of the line B-B shown in FIG. 2.

FIG. 2 shows an example of the arrangement of the main and sub-after air ports and is a cross sectional view of the line A-A shown in FIG. 1. FIG. 3 is a drawing of the section B-B shown in FIG. 2 viewed from the combustion space side. A plurality of main after air ports 37 are generally arranged perpendicularly to the flow of combustion gas and the main after air ports of the same number are arranged on the side of the front wall 45 of the furnace and the side of the back wall 46 thereof. The sub-after air ports 38 are arranged in the same window box as that of the main after air ports 37. The simplest arranging method of the sub-after air ports 38 is to alternately arrange them between the main after air ports 37. The flow paths of main after air and sub-after air are divided by a partition plate 39 and the air amounts flowing into the respective flow paths are adjusted by the main after air adjustment mechanism 40 and the sub-after air adjustment mechanism 41.

Figure 4:
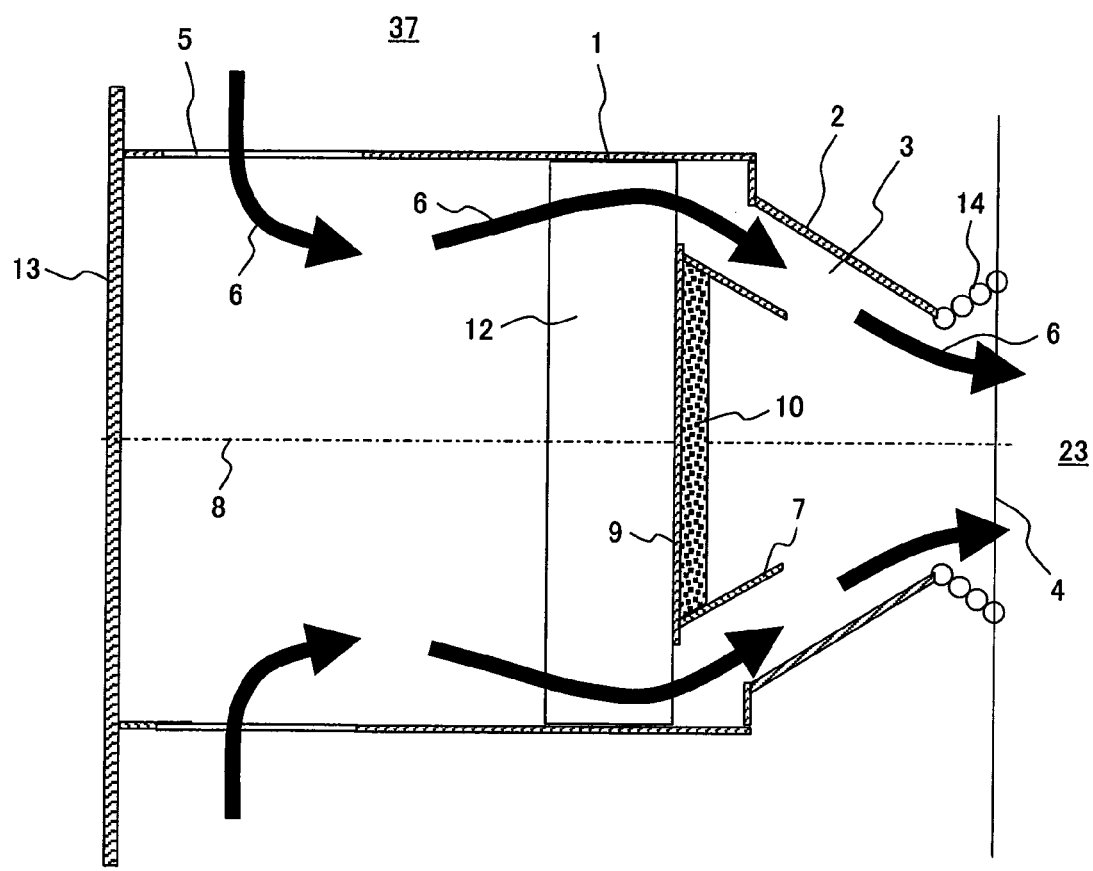
FIG. 4 is a cross sectional view showing an embodiment of the main after air ports in the first embodiment.

FIG. 4 shows an example of the detailed structure of the main after air port in the first embodiment. The basic structure of the nozzle is a cylindrical shape having a central axis 8 of a jet as a symmetrical axis. The nozzle is surrounded by an outer cylinder 1 of the window box and air for combustion flows in from an opening 5 of the window box. Air flows along arrows 6 and is jetted into the intra-furnace combustion space 23 from a jet port 4. The jetted air is mixed with combustible gas in the intra-furnace combustion space 23 and permits the combustible gas to burn. Around the jet port 4, water tubes 14 are installed. On the side of the jet port 4 of the after air port, a vena contracta member 2 is installed. The vena contracta member 2 has a structure that the caliber gradually becomes small toward the side of the jet port 4. By the vena contracta member 2, to the flows 6 of air, the speed component toward the central axis of the nozzle is given and a vena contracta 3 is formed. In the neighborhood of the entrance of the vena contracta 3, a member 7 for specifying the minimum flow path area of the vena contracta is installed. The air flow speed in the vena contracta is specified by the area of the part the opening area of which is minimum in the vena contracta. In the constitution shown in FIG. 4, at the end of the member 7 for specifying the minimum flow path area of the vena contracta, the flow speed of the vena contracta is maximized. The member 7 for specifying the minimum flow path area of the vena contracta shown in FIG. 4 is structured so that the outside diameter thereof is reduced gradually toward the jet port 4. The reason is to reduce the disturbance of the flow in the vena contracta 3. By reducing the disturbance, NOx can be prevented from sudden increase. However, by use of another structure, the object of the present invention can be accomplished. The member 7 for specifying the minimum flow path area of the vena contracta is fixed to a support material 9 of the member for specifying the minimum flow path area of the vena contracta. The support material 9 of the member for specifying the minimum flow path area of the vena contracta is fixed to the outer cylinder 1 of the window box via a guide 12.

Inside the member 7 for specifying the minimum flow path area of the vena contracta, an overheat prevention member 10 is installed. The reason is to prevent the support material 9 of the member for specifying the minimum flow path area of the vena contracta from burning due to radiation heat from a flame formed in the inter-furnace combustion space 23. When the flame radiation heat formed in the inter-furnace combustion space 23 is low or when the support material 9 can be cooled by another method, the overheat prevention member is not always necessary.

Embodiment 2

Figure 5:
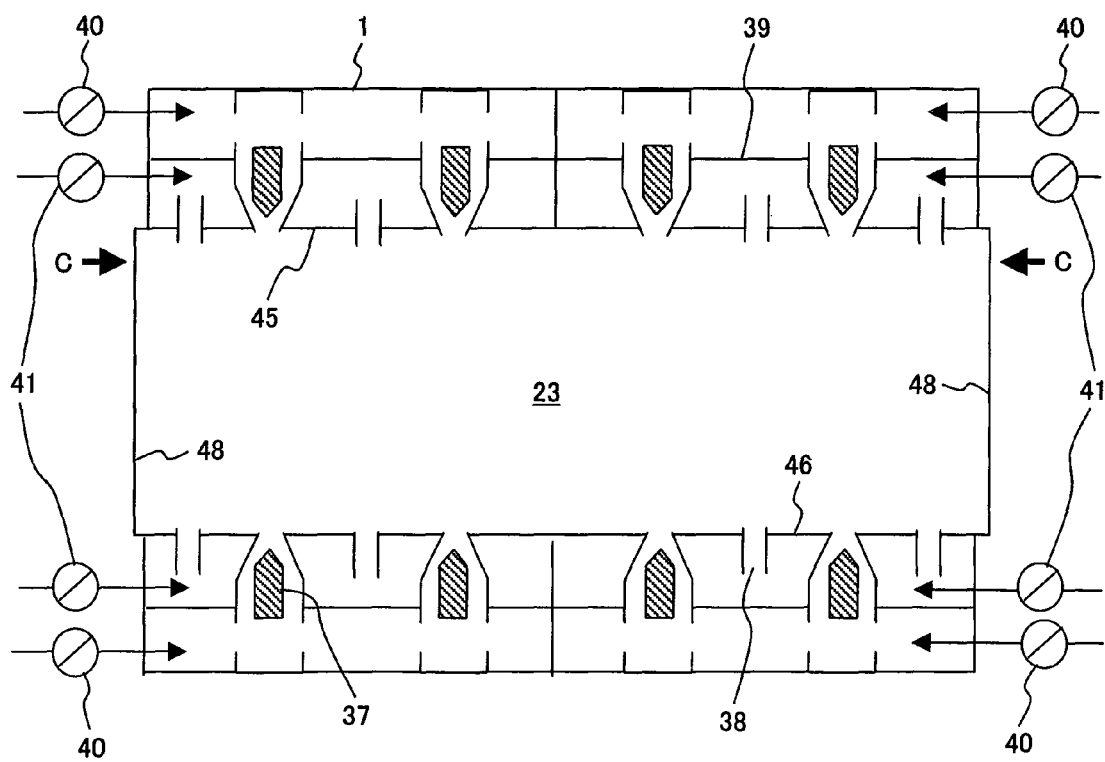
FIG. 5 is a cross sectional view of another embodiment of the after air ports, which is equivalent to the line A-A shown in FIG. 1.
Figure 6:
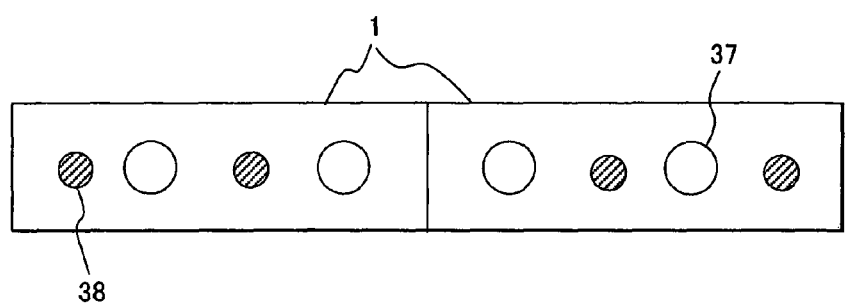
FIG. 6 is a cross sectional view of the line C-C shown in FIG. 5.

In this embodiment, the case that the arrangement of the after air ports is changed will be explained. FIG. 5 shows a modified example of the arrangement of the sub-after air ports 38 and it is equivalent to the sectional view A-A shown in FIG. 1. FIG. 6 is a drawing of the section C-C shown in FIG. 5 which is viewed from the combustion space side.

The window box connected to the after air ports in the same row is divided into two parts and air is supplied from the same window box respectively to the main after air ports 37 and sub-after air ports 38. If the window box is divided like this and air is supplied, the air flow rates of main after air and sub-after air can be adjusted finely, so that the supply is little varied and air can be mixed efficiently.

Embodiment 3

Figure 7:
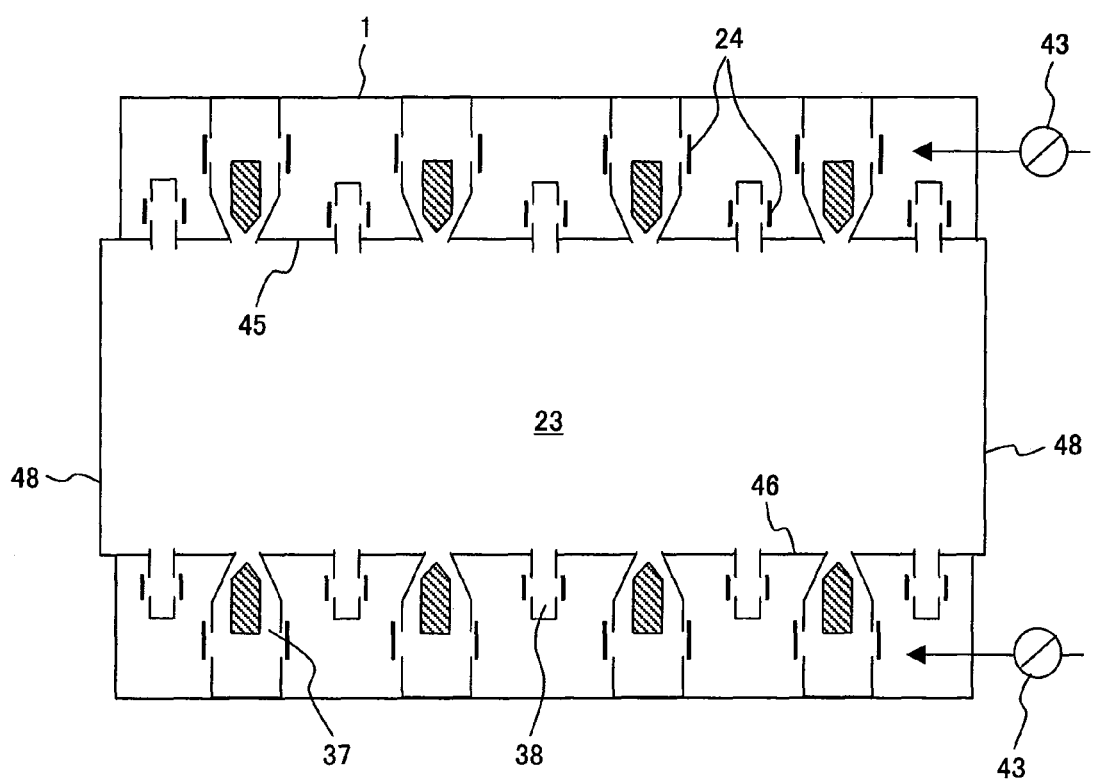
FIG. 7 is a cross sectional view of still another embodiment of the after air ports, which is equivalent to the line A-A shown in FIG. 1.
Figure 8:
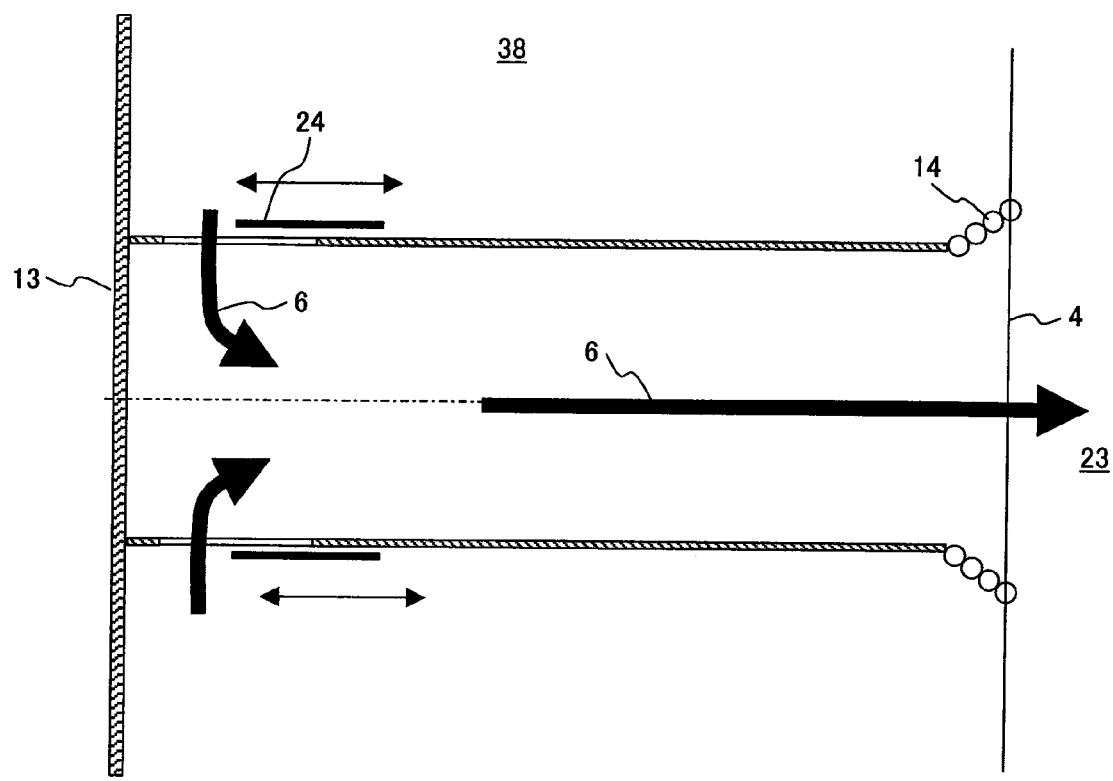
FIG. 8 is a cross sectional view showing an embodiment of the sub-after air ports in the first embodiment.

In this embodiment, a modification example of the air adjustment mechanism of the after air ports will be explained. FIG. 7 shows a modified example of the air adjustment mechanism of main and sub-after air and it is equivalent to the sectional view A-A shown in FIG. 1. FIG. 8 shows an example of the detailed structure of the sub-after air ports.

The flow paths of the main after air and sub-after air are the same and the air flow rates supplied to the main after air ports 37 and sub-after air ports 38 are adjusted by opening or closing the damper 24. If the damper 24 is installed like this, the air flow rate can be adjusted finely, so that the supply is little varied and air can be mixed efficiently. The damper 24 may be installed only on the main after air ports 37, though it is preferable to install it both on the main after air ports 37 and sub-after air ports 38.

Embodiment 4

Figure 9:
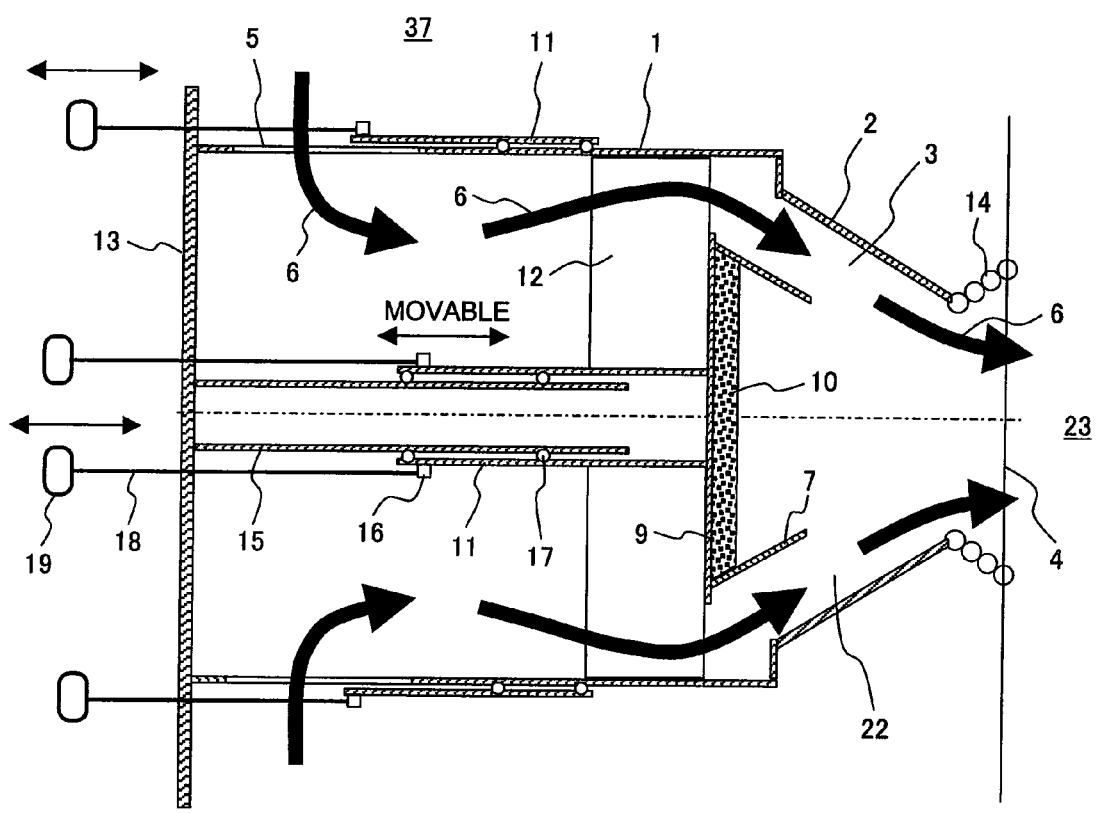
FIG. 9 is a cross sectional view showing another embodiment of the main after air ports in the first embodiment.

In this embodiment, a modified example of the structure of the main after air ports will be explained by referring to FIG. 9. The differences from FIG. 4 are that the structure includes an inner cylinder 15 for moving the member 7 for specifying the minimum flow path area of the vena contracta and a slide ring 11 for adjusting air entering from the opening 5 of the window box.

The member 7 for specifying the minimum flow path area of the vena contracta is fixed to the support material 9 of the member for specifying the minimum flow path area of the vena contracta. The support material 9 of the member for specifying the minimum flow path area of the vena contracta is fixed to the slide ring 11. The slide ring 11 is attached to the inner cylinder 15. However, the slide ring 11 and outer cylinder are not fixed and the slide ring 11 can move toward the outer wall 13 of the window box shown in FIG. 1 or toward the jet port 4. If the slide ring 11 moves, the support material 9 of the member for specifying the minimum flow path area of the vena contracta and the member 7 for specifying the minimum flow path area of the vena contracta move simultaneously. If the member 7 for specifying the minimum flow path area of the vena contracta moves, the area of the minimum flow path 22 of the vena contracta is changed. At this time, in the shape of the contraction flow section 3, the outside diameter is kept unchanged and the inside diameter is changed, thus the cross sectional area of the flow path (the section perpendicular to the central axis of the nozzle) of the vena contracta 3 is changed.

If a guide roller 17 is attached to either of the slide ring 11 and the inner cylinder 15, the slide ring 11 can be moved smoothly. To the slide ring 11, a slide ring moving bar fixing mechanism 16, a slide ring moving bar 18, and a handle 19 are attached, thus from the outside of the outer wall 13 of the window box (the left side in FIG. 9), the member 7 for specifying the minimum flow path area of the vena contracta can be moved. If the slide ring 11 is attached to the outer cylinder 1 of the window box and the area of the opening 5 of the window box is changed, the total amount of air entering the main after air ports can be changed. When the change of the total air amount is not necessary or it can be changed by another method, the slide ring 11 may not be attached to the outer cylinder 1 of the window box.

If a guide 12 is attached to the slide ring 11, when the slide ring 11 is moved, the core of the member for specifying the minimum flow path area of the vena contracta is hardly shifted. Further, the slide ring 11 and the support material 9 of the member for specifying the minimum flow path area of the vena contracta can be fixed strongly. Further, the flow 6 of air can be adjusted easily.

Embodiment 5

Figure 10:
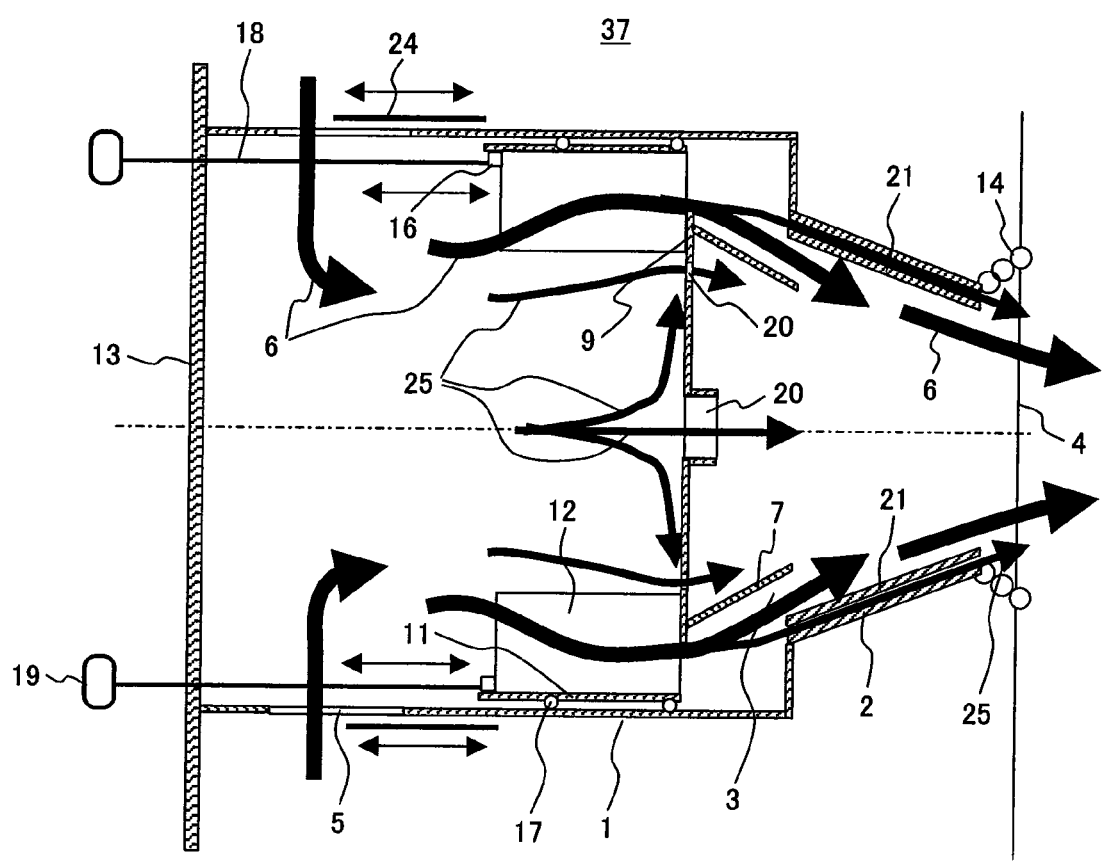
FIG. 10 is a cross sectional view showing still another embodiment of the main after air port in the first embodiment.

In this embodiment, another modified example of the main after air ports will be explained by referring to FIG. 10. In FIG. 10, the differences from FIG. 4 are that the support material 9 of the member for specifying the minimum flow path area of the vena contracta, the flow path for air cooling to cool a vena contracta member 2, and the damper 24 for adjusting air flowing from the opening 5 of the window box are installed.

In the support material 9 of the member for specifying the minimum flow path area of the vena contracta, a cooling air hole 20 is formed. A part of air introduced from the opening 5 of the window box becomes a flow 25 of cooling air and is discharged from the cooling air hole 20. In the process thereof, it collides with the support material 9 of the member for specifying the minimum flow path area of the vena contracta and can cool the member. Further, a part of air discharged from the cooling air hole 20 collides with the member 7 for specifying the minimum flow path area of the vena contracta and can cool the member.

Furthermore, in the neighborhood of the vena contracta 3, a cooling air guide plate 21 is installed. Cooling air flows between the cooling air guide plate 21 and the vena contracta member 2 and the vena contracta member 2 can be cooled. Further, the cooling air flows on the outermost periphery side of the jet port 4, so that it can be used to remove coal ash adhered to the periphery of the jet port 4. Furthermore, when the amount of coal ash adhered to the periphery of the jet port 4 is increased, it is desirable to increase temporarily the air amount flowing between the vena contracta member 2 and the cooling air guide plate 21 and remove easily adhered ash. Further, the angle of the vena contracta member 2 may be changed in the middle of the vena contracta.

If the damper 24 is attached to the outer cylinder 1 of the window box and the area of the opening 5 of the window box is changed, the total amount of air flowing into the main after air ports can be changed.

Embodiment 6

Figure 11:
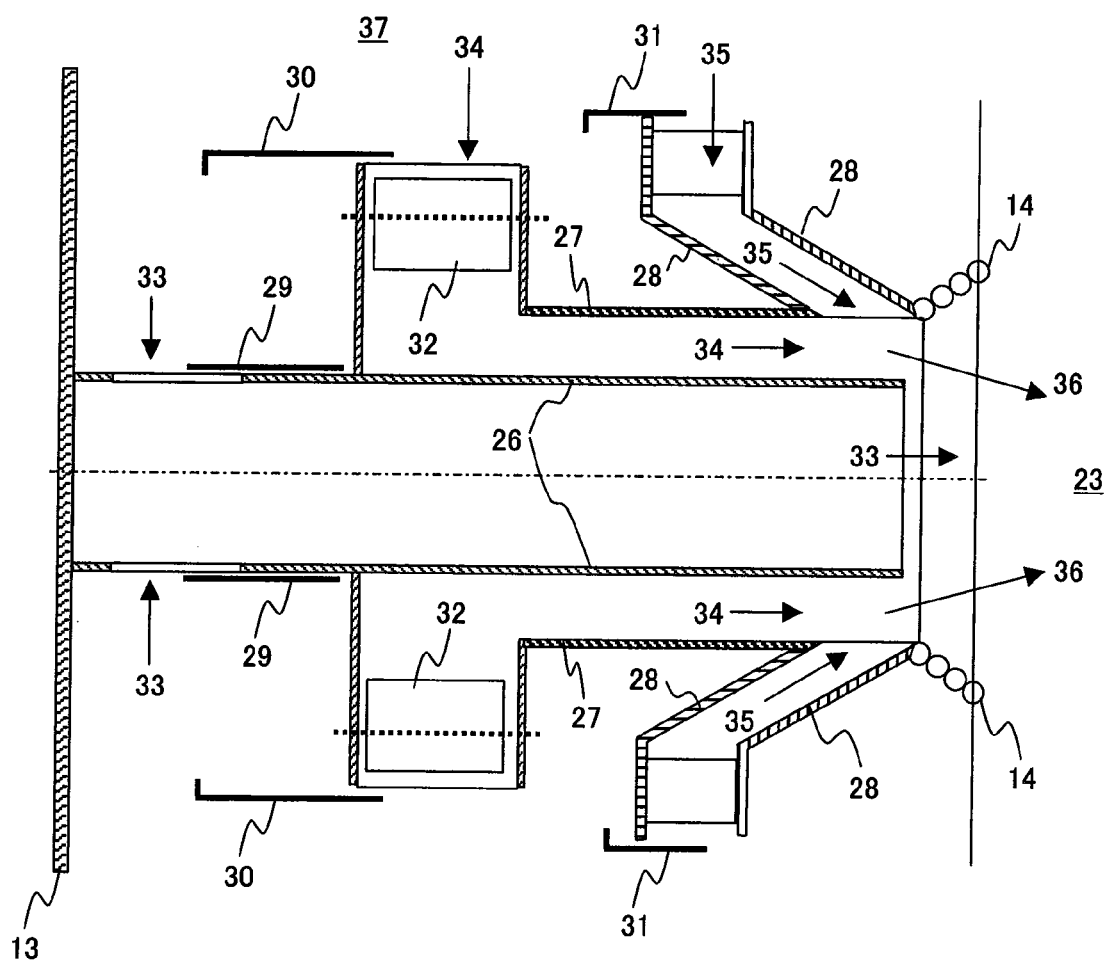
FIG. 11 is a cross sectional view showing other embodiment of the main after air ports in the first embodiment.

In this embodiment, still another modified example of the structure of the main after air ports will be explained by referring to FIG. 11. In FIG. 11, at the center of the air ports, a primary nozzle 26, a secondary nozzle 27 outside the primary nozzle 26, and a tertiary nozzle 28 outside the secondary nozzle 27 are installed. Tertiary air 35 jetted from the tertiary nozzle joins secondary air 34 at the exit of the secondary nozzle 27 and flows into the combustion space 23. Here, the jet direction of the secondary nozzle 27 is parallel with the jet central axis 8 of the air ports. Furthermore, to the secondary air 34, the rotational force is given by a secondary air resistor 32. The tertiary nozzle is installed in the inward direction from the shaft and it is a preferred structure to form a vena contracta. When the flow rates of the secondary air 34 and tertiary air 35 are changed, the directions of the secondary air and tertiary air after joint can be adjusted. For example, assuming the flow rate of the tertiary air 35 as zero, the inward angles of the secondary air and tertiary air after joint are zero. Further, assuming the flow rate of the secondary air 34 as zero, air is jetted in the direction of the tertiary nozzle. By adjustment of the jet direction, there exists excessive fuel in the furnace, and gas of insufficient air and air are mixed preferably, and unburned components can be reduced. Furthermore, depending on the strength of rotation of the secondary air, the mixing state can be adjusted. For adjustment of the flow rate, a primary damper 29, a secondary damper 30, and a tertiary damper 31 are installed.

Pulverized coal includes ash in fuel. In this case, when a vena contracta is formed at the exit of the after air port, ash fused in combustion gas at high temperature may be adhered to the neighborhood of the water tube 14 at the exit of the air port. When the ash adhesion grows and forms a clinker, there are possibilities that it disturbs the flow and falls and causes damage to the water tube. In such a case, it is preferable to reduce the flow rate of the tertiary air while the clinker is small, increase the flow rate of the secondary air, lower the temperature of the clinker, thereby generate heat stress, and separate the clinker.

Embodiment 7

Figure 12:
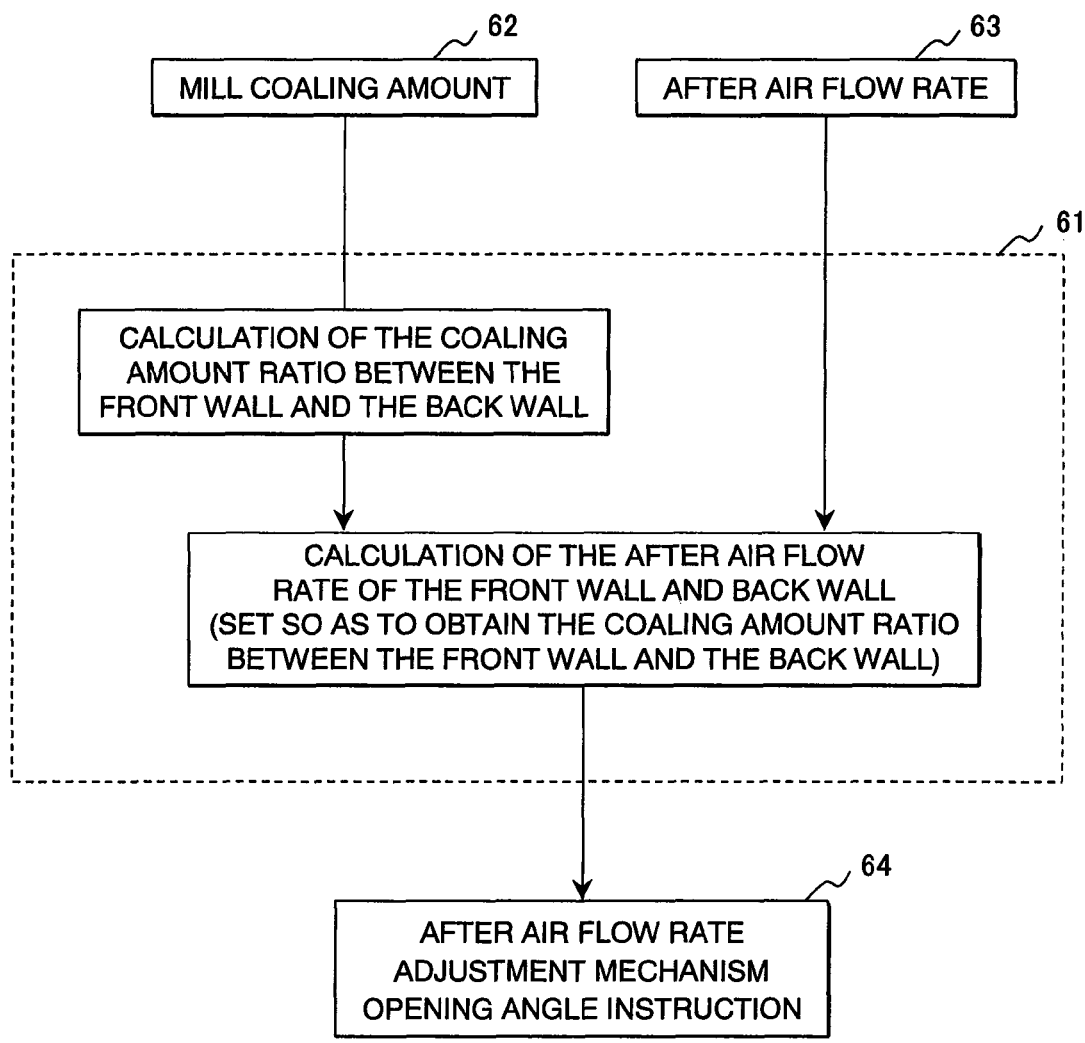
FIG. 12 is a block diagram showing a control example of the after air flow rate which is executed by the controller.

In this embodiment, the air flow rate control method of the after air ports will be explained by referring to FIGS. 1 and 12. The mill coaling amount 62 supplied from the mill is measured by the coaling amount detector 59 and its signal is input to the controller 61. Further, the after air flow rate 63 is measured by the after air flow rate detector 60 and its signal is input to the controller 61. The controller 61 always decides the coaling amounts 62 of the front wall and back wall, and calculates the coaling amount ratio between the front wall and the back wall, thus the after air flow rates of the front wall and back wall are calculated. By a signal from the controller 61, an after air flow rate adjustment mechanism opening angle instruction 64 is sent to the main after air flow rate adjustment mechanism 40 and sub-after air flow rate adjustment mechanism 41 and the after air flow rate jetted to the intra-furnace combustion space 23 is controlled. When the suspension burner is positioned on the front wall side of the furnace, the controller 61, on the basis of the mill coaling amount 62, sets the after air flow rate set value on the front wall of the furnace low and can adjust the after air flow rate 63. Inversely, when the suspension burner is positioned on the back wall side of the furnace, the controller 61, on the basis of the mill coaling amount 62, sets the after air flow rate set value on the back wall of the furnace low and can adjust the after air flow rate 63. By use of this control method, the after air flow rate can be controlled according to the operating condition of the burners, so that NOx and CO can be reduced effectively.

Embodiment 8

Figure 13:
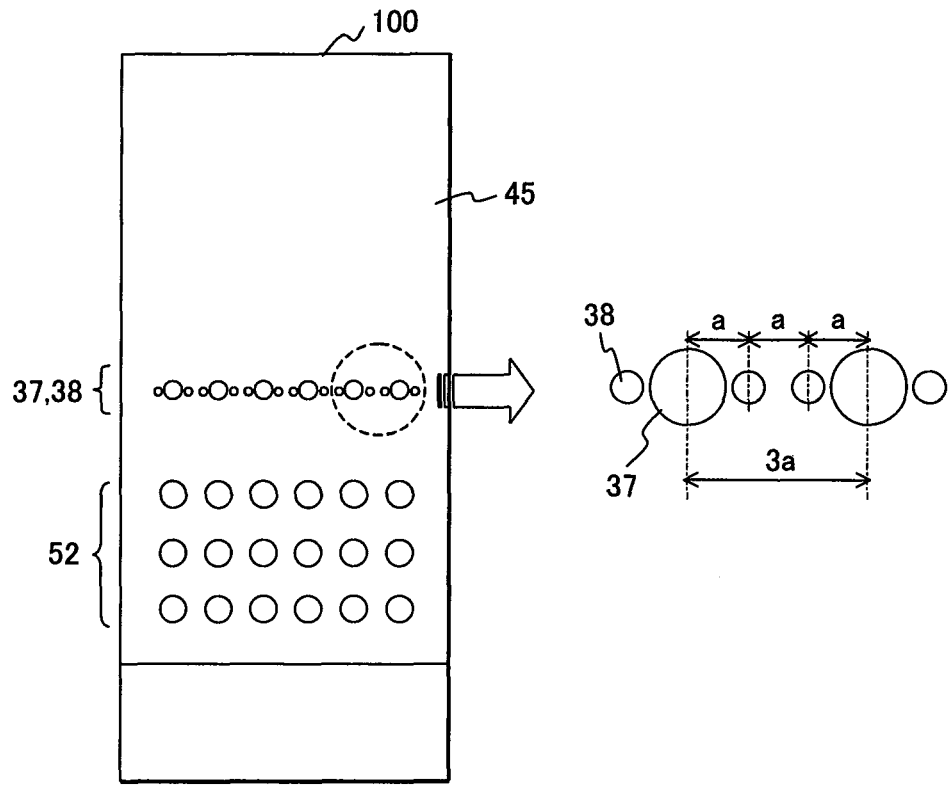
FIG. 13 is a drawing showing an arrangement of the burners and after air ports in the first embodiment.

This embodiment of the present invention will be explained by referring to FIG. 13. FIG. 13 shows the arrangement of the ports on the front wall 45 of the furnace. On the lower part of the boiler, burners 52 in a plurality of rows and columns are arranged and on the downstream side thereof, the after air ports 37 and 38 are arranged. In each same row as that of the burners 52, the main after air port 37 is arranged and the sub-after air ports 38 are arranged on both sides thereof. Namely, between the two neighboring main after air ports 37, two sub-after air ports 38 are arranged. The interval between the main after air port 37 and the sub-after air port 38 is ¼ to ⅓ of the distance between the main after air ports (that is, between the burners). Further, in FIG. 13, the concerned interval is ⅓ of the distance between the main after air ports (that is, between the burners).

And, from the main after air port 37 arranged in each same row as that of the burners 52, a large amount of high-speed air is jetted, thus unburned gas is prevented from slipping through the central part of the furnace, and from the sub-after air ports 38 arranged on both sides of the main after air port 37, a smaller amount of air than that of the main after air port 37 flows, thus unburned gas is prevented from slipping through the neighborhood of the front wall 45 and back wall 46 (refer to FIG. 1) of the furnace. Two kinds of main and sub-after air ports are used like this, and a plurality of sub-after air ports for supplying a smaller amount of air than the supply air amount of the main after air port are arranged between the main after air ports, thus unburned gas is prevented from slipping through the central part of the furnace, and the slipping through the front wall and back wall of the furnace can be suppressed. Therefore, the mixture in the furnace can be promoted and the rapid mixture can be suppressed, so that the CO concentration and NOx concentration at the exit of the furnace can be reduced.

Further, it is desirable to set the air flow rate jetted from the main after air ports 37 to 70 to 90% of the total air amount (that is, the sum of the air amounts jetted from the main after air ports and sub-after air ports) from the after air ports. The reason is that when the air flow rate of the main after air ports 37 becomes 60% or less, even if air is jetted at high speed, the penetration force cannot be maintained, and slipping of unburned gas through the central part of the furnace is caused.

Further, when a plurality of sub-after air ports 38 are arranged between the main after air ports 37, it is desirable that the jet port of each of the sub-after air ports 38 is arranged so that the jet direction from the sub-after air ports 38 does not cross the jet of the main after air port 37 adjoining the sub-after air ports 38 and is inclined 0 to 15° to the jet direction of the main after air port 37. The jet from the sub-after air ports 38 has a lower flow rate than that of the main after air ports 37, so that it has smaller penetration force than that of the main after air ports 37 and is apt to flow along the wall face of the furnace 100. Therefore, the slipping between the sub-after air ports 38 is caused easily, so that the jet is arranged so as not to cross the jet from the neighboring main after air ports 37 (that is, between the neighboring sub-after air ports 38, both jets are arranged so as to cross each other), thus the slipping between the sub-after air ports 38 is prevented.

And, the main after air ports. 37 are desirably a multi-tube structure on the concentric axis. The ports jet a straight flow from the circular tube at the central part and jet a rotational flow from the outer periphery. The flow rate ratio of the direct flow to the rotational flow is changed, thus the main flow penetration force from the after air ports can be adjusted.

Here, the operation and effects of this embodiment will be explained. Among the boilers for burning fossil solid fuel such as coal, in a system that a combustor (burner) is installed on the front wall of the boiler furnace and back wall of the furnace and flames are permitted to collide with each other and burn at the center of the furnace, the reduction in NOx depends mostly on the performance of the combustor (burner). Namely, by separating the fuel conveying flow of the combustor (burner) and combustion air flow thereof, a high-temperature reducing flame with a reduction region formed between the combustion regions is formed in the burner flame and the NOx forming amount by the burner section is suppressed. However, when the fuel conveying flow of the combustor (burner) and combustion air flow thereof are separated, a high-temperature reducing flame is formed in the burner section, so that a nonuniform gas flow is generated in the furnace, and a distribution of unburned fuel components (unburned gas) is formed in the sectional direction of the furnace, and CO is generated easily. Therefore, a double combustion air input method from the after air ports according to the sectional distribution of such nonuniform unburned gas is important.

Further, the flames collide with each other at the center of the furnace, so that combustion gas is generated at the central part of the furnace and a distribution of unburned gas is generated in the neighborhood of the front wall and back wall of the furnace. Therefore, between the burners and in the neighborhood of the front wall and back wall of the furnace, the high CO concentration and high NOx concentration are apt to generate.

From the aforementioned, promotion of mixture of the jet from the after air ports and the intra-furnace combustion gas is necessary. However, if the jetting speed of the jet of the after air ports is just increased and the concerned jet and gas are mixed quickly, in the post flow (on the downstream side) of the after air ports, the unburned gas is burned quickly and a local high-temperature portion is formed, so that a problem arises that thermal NOx is generated. Inversely, if the jetting speed of the after air ports is just made low, the jet does not reach the central part of the furnace and a problem arises that unburned gas slips through. Therefore, it is a problem how to prevent generation of thermal NOx and promote mixture by preventing slipping through the central part of the furnace.

Figure 14:
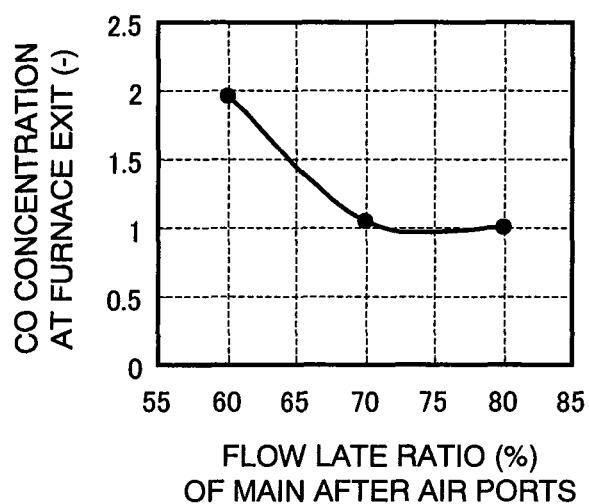
FIG. 14 is a drawing showing the relation between the ratio of the flow rate of the main after air ports to the total flow rate of after air and the CO concentration at the exit of the furnace in the first embodiment.
Figure 15:
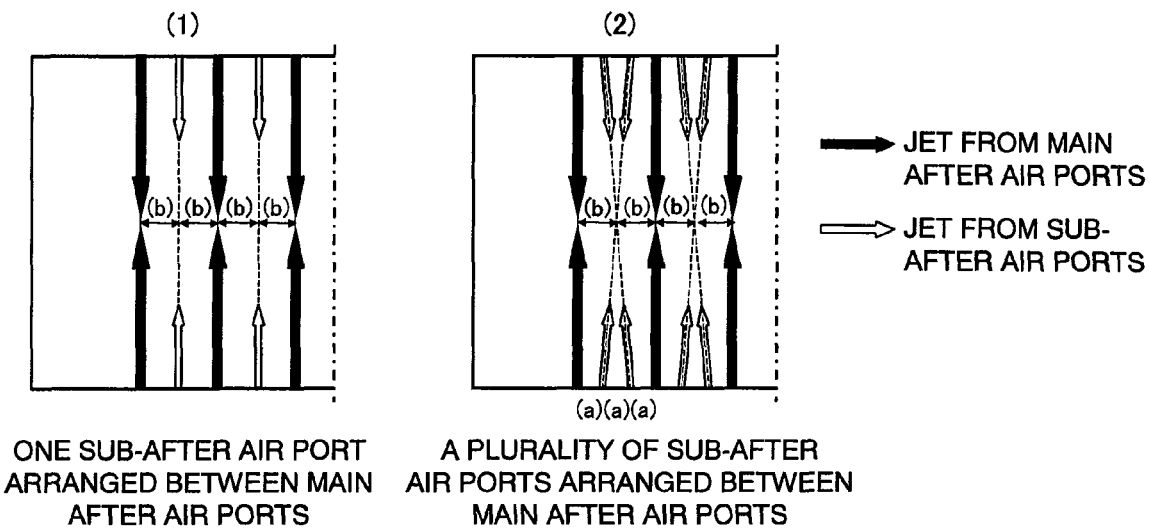
FIG. 15 is a drawing showing the position of the sub-after air ports and jet direction in the first embodiment.

Here, FIG. 14 shows the CO concentration change at the exit of the furnace when the flow rate ratio of the main after air ports 37 to the total air amount used for the after air ports is changed. Assuming the flow rate ratio of the main after air ports 37 as 60%, the CO concentration at the exit of the furnace is increased suddenly. The reason is that the air jet from the main after air ports 37 loses the penetration force and slipping through the central part of the furnace is generated. Therefore, it is desirable to increase the flow rate ratio of the main after air ports 37 to 70% or more.

Further, if the ratio of the flow rate from the sub-after air ports 38 to the total air amount used for the after air ports is high, the rate of the air port jet in the neighborhood of the front wall 45 and back wall 46 of the furnace becomes high. On the other hand, if the jet rate from the sub-after air ports 38 is low, slipping of unburned gas is generated in the neighborhood of the wall face of the furnace between the sub-after air ports 38. Therefore, when the ratio of the flow rate from the sub-after air ports 38 is low, the jet port of the sub-after air ports 38 is arranged so that the jet direction from the sub-after air ports 38 does not cross the jet of the main after air port 37 adjoining the sub-after air ports 38 and is inclined 0 to 15° to the jet direction of the main after air port 37, thus slipping between the sub-after air ports can be prevented.

Figure 16:
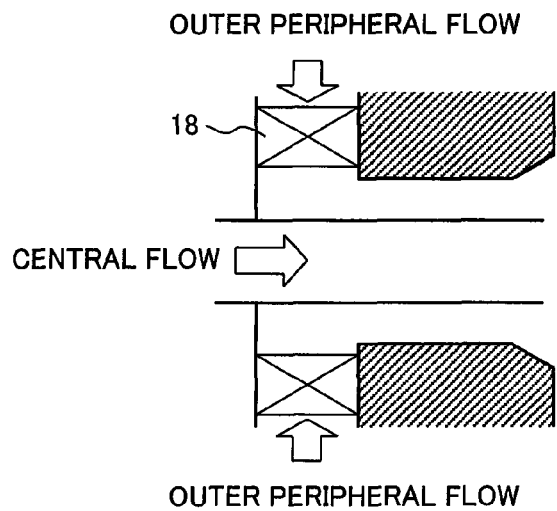
FIG. 16 is a drawing showing the air port structure of the main after air port in the first embodiment.

FIG. 16 shows an example of the air jet direction from the sub-after air port 38. When one sub-after air port 38 is arranged between the main after air ports 37 (equivalent to FIG. 16(1)), the sub-after air port 38 is arranged at the center between the main after air ports 37 and the air jet direction from the sub-after air port 38 is the same direction as that of the jet of the main after air ports 37. When a plurality of sub-after air ports 38 are arranged between the main after air ports 37 (equivalent to FIG. 16(2)), the sub-after air ports 38 are arranged at even intervals between the main after air ports 37 and jet air toward the central position between the main after air ports 37 at the central part of the furnace.

Figure 17:
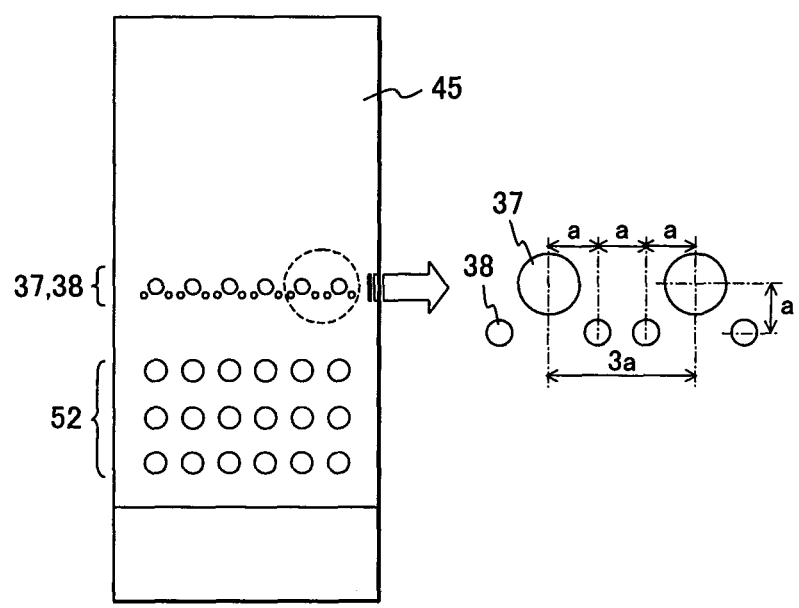
FIG. 17 is a drawing showing another arrangement of the burners and after air ports in the first embodiment.

FIG. 17 shows an example of the air port structure of the main after air ports 37. The main after air ports 37 have a multi-circular tube structure on the concentric axis. The ports jet a straight flow from the circular tube at the central part and jet a rotational flow from the outer periphery. If the main after air ports 37 are formed as a composite port composed of a multi-tube for jetting a straight flow and a rotational flow, adjustment of the penetration force (prevention of slipping of unburned gas through the furnace center) and promotion of mixture of unburned gas between the main after air ports 37 and the sub-after air ports 38 (effect of the rotational flow) can be expected.

As mentioned above, in this embodiment, the main after air ports 37 and the sub-after air ports 38 are installed at even intervals at a distance of ¼ to ⅓ of the distance between the main after air ports (that is, between the burners). However, if the prevention of slipping of unburned gas in the neighborhood of the front wall 45 and back wall 46 of the furnace is possible, the present invention is not limited to the above numerical value and they may not be installed at even intervals.

Embodiment 9

Figure 19:
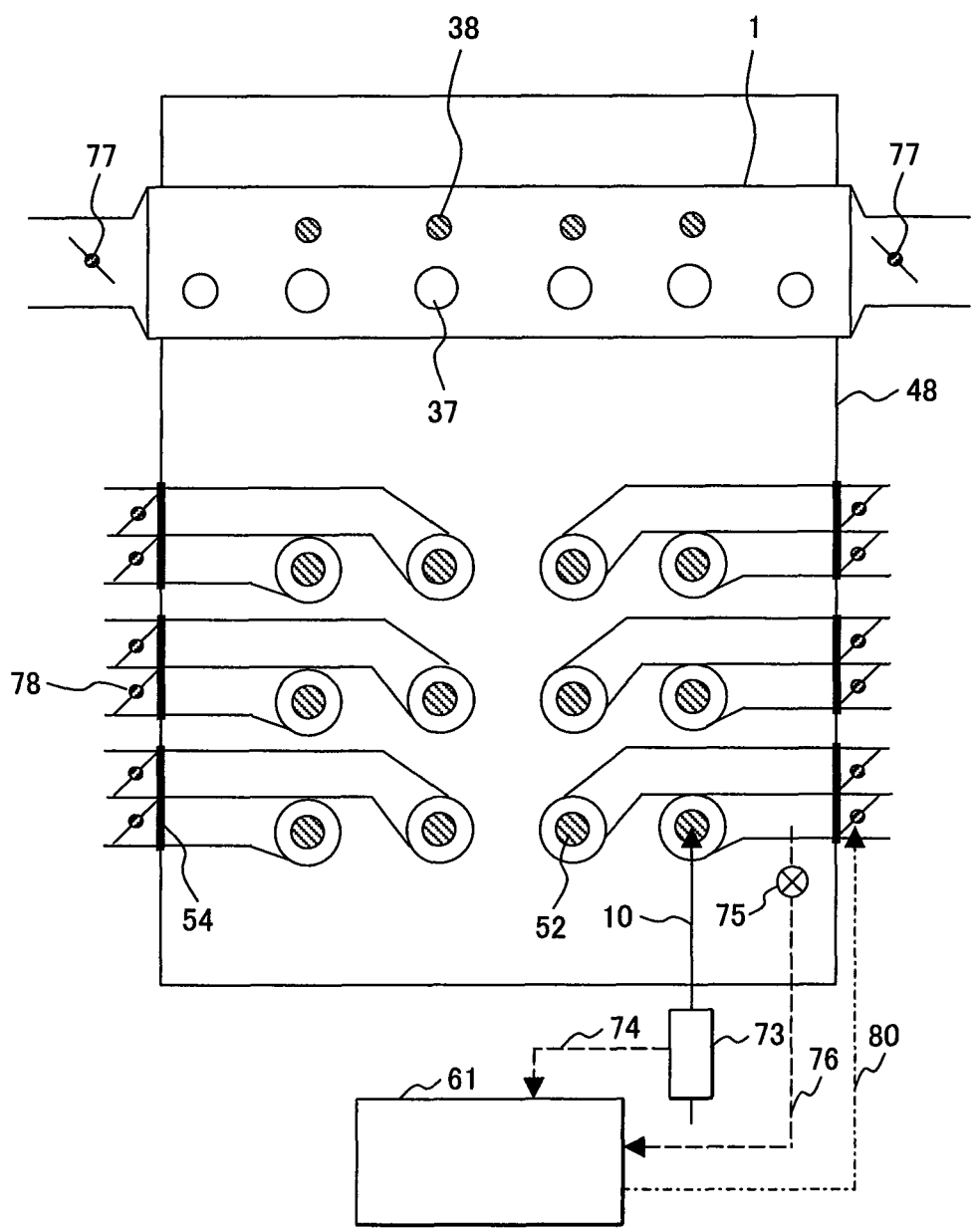
FIG. 19 is a schematic view of the boiler viewed from the front wall side of the furnace relating to the second embodiment of the present invention.

This second embodiment of the present invention will be explained by referring to FIG. 19. FIG. 19 shows the port arrangement of the front wall 45 of the furnace of the boiler when the sub-after air ports 38 are arranged on the downstream side of the main after air ports 37.

The periphery of the air jet from the after air ports forms a high-temperature region due to mixture with unburned gas. Therefore, instead of generating a local high-temperature region by a single after air port jet, by dividing the jet and realizing slow combustion, the local high-temperature region around the jet can be made smaller and thermal NOx can be suppressed effectively. In this embodiment, the sub-after air ports 38 are arranged on the downstream side of the main after air ports 37, thus the rapid mixture of the jet from the main after air ports 37 with unburned gas is suppressed and slow combustion is realized, thereby a further effect of suppression of thermal NOx is obtained. FIG. 19 shows an example that the sub-after air ports 38 are set at the position on the upstream side away by ⅓ of the distance between the main after air ports 37, though the numerical value is not limited to the aforementioned.

Further, when the sub-after air ports 38 are arranged on the downstream side of the main after air ports 37, the sub-after air ports 38 play a role in suppression of slipping of unburned gas in the neighborhood of the front wall 45 and back wall 46 of the furnace and CO can be suppressed.

Embodiment 10

Figure 18:
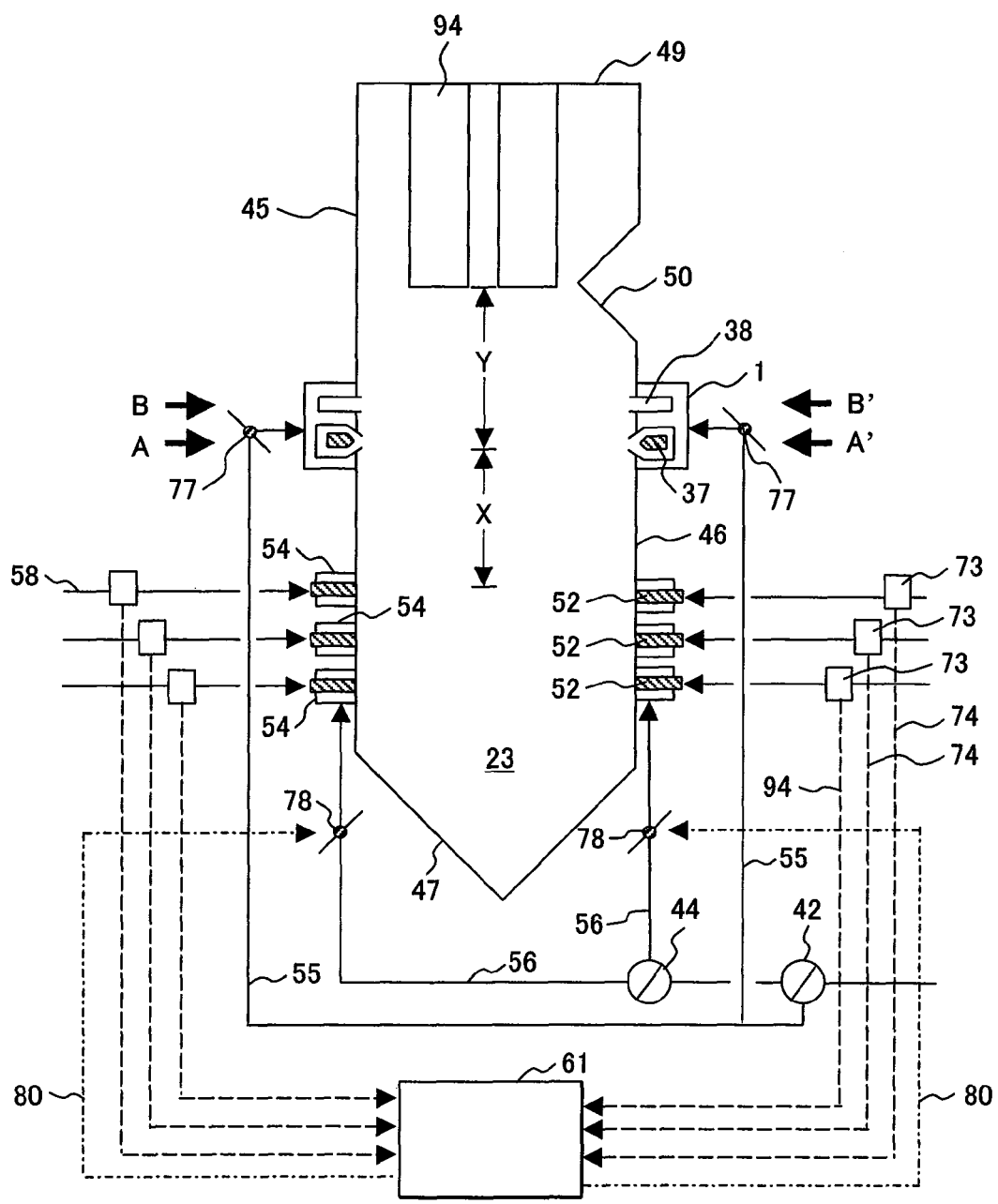
FIG. 18 is a schematic constitution of a pulverized coal boiler and a supply system of air and pulverized coal thereof relating to a second embodiment of the present invention.

FIG. 18 is a schematic block diagram of the pulverized coal-fired boiler relating to the second present invention. The wall face of the furnace is surrounded by the upper furnace ceiling 49, lower hopper 47, side furnace front wall 45, furnace back wall 46, nozzle 50, and furnace side wall 48 (shown in FIG. 20) and on the respective wall faces, water tubes not drawn are arranged. By the water tubes, a part of the heat of combustion generated in the furnace combustion space 23 is absorbed. The combustion heat is collected mainly by a heat exchanger 94 installed on the downstream side of the furnace. The heat exchanger 94 is fixed by the furnace ceiling 49 and has a structure of thermally extending toward the upstream side of the furnace. Combustion gas generated in the furnace combustion space 23 flows from underneath to above and is discharged. The gas after combustion passes through a back heat transfer section not drawn and here, the heat included in the gas is collected furthermore.

On the downstream side of the burners, the main after air ports 37 are installed. A plurality of main after air ports are generally installed respectively on the front wall and back wall of the furnace. The structure of the main after air ports 37 is a vena contracta type structure that the air flow is directed in the direction of the central axis of the main after air ports in the neighborhood of the jet port. The detailed structure will be described later. The greater part of the unburned components such as CO generated from the flames of insufficient air formed by the burner section is mixed with main after air, thereby is burned completely (oxidation). However, when the unburned components and main after air are mixed, NOx (mainly thermal NOx) is also generated. The generation amount of NOx is related to the momentum of main after air (the maximum flow speed of the vena contracta) and the adjustment of the momentum of main after air is important. Furthermore, if the jetting condition of main after air is set so as to lower NOx, the oxidation becomes insufficient, and CO is apt to be generated easily, so that in consideration of the performance balance of NOx and CO, the jetting condition of main after air must be set.

On the downstream side of the main after air ports 37, the sub-after air ports 38 are installed. A plurality of sub-after air ports 38 are generally installed respectively on the front wall and back wall of the furnace. The structure of the sub-after air ports 38 is a structure capable of supplying a rotation flow. The detailed structure will be described later. The greater part of the unburned components such as CO generated from the flames of insufficient air is mixed with main after air, thereby is burned completely, though a part thereof slips between the main after air ports 37. To prevent generation of NOx and effectively mix the unburned components with air, the adjustment of the momentum of the sub-after air is important.

The sub-after air ports 38 are desirably arranged so that the distance between the central position of the section of the sub-after air ports 38 and the central position of the section of the main after air ports 37 becomes equal to 1 to 5 times of the caliber of the main after air ports 37. If the center of the section of the sub-after air ports 38 is positioned on the downstream side by a length of 5 or more times of the caliber of the main after air ports 37, sub-after air 71 cannot be supplied to unburned components 70 stagnant in the neighborhood of the main after air ports 37, so that the CO concentration in the neighborhood of the furnace wall is increased. Inversely, if the center of the section of the sub-after air ports 38 is positioned on the upstream side by a length of 5 or more times of the caliber of the main after air ports 37, the flow of main after air 72 supplied from the main after air ports 37 is disturbed by unburned gas in the neighborhood of the furnace wall, so that air cannot be supplied to the enter of the furnace. Furthermore, the sub-after air 71 is jetted under the condition of high gas temperature, so that the NOx concentration is increased. Further, unless the sub-after air ports 38 are installed at a distance 1 or more times of the caliber of the main after air ports 37, the sub-after air is rolled in the jet from the main after air ports, so that the effect of the sub-after air ports cannot be obtained.

Air for combustion is distributed to the secondary and tertiary air 56 for the burners and after air 55 by the air flow rate distribution adjustment mechanism 42. The secondary and tertiary air 56 supplied to the burners is distributed to air flowed to the burner on the front wall side and air flowed to the burner on the back wall side by the air flow rate distribution adjustment mechanism 44. The secondary and tertiary air 56 for the burners flowing through the burners on the front wall side and the burners on the back wall side, according to a pulverized coal flow rate 74 measured by a pulverized coal flowmeter 73, is controlled to the secondary and tertiary air flow rate set values for the burners which are set by the controller 61. To the controller 61, the pulverized coal flow rate 74 measured by the pulverized coal flowmeter 73 and secondary and tertiary air flow rates 76 for the burners detected by a secondary and tertiary air flow rate detector 75 for the burners are input (FIG. 19). The controller 61, when there is a deviation in the pulverized coal mount supplied from one mill, increases the secondary and tertiary air flow rates 76 for the burners of the burners 52 to which much pulverized coal is supplied on the basis of the pulverized coal flow rate 74 and decreases the secondary and tertiary air flow rates 76 for the burners of the burners 52 to which little pulverized coal is supplied, thereby can independently adjust the air flow rate of each burner.

The after air 55 is distributed to air flowing to the after air ports on the front wall side and air flowing to the after air ports on the back wall side by an after air flow rate adjustment mechanism 77. Air of the after air ports on the front wall side and air of the after air ports on the back wall side are distributed furthermore to air flowing to the main and sub-after air ports by the main after air flow rate adjustment mechanism and sub-after air flow rate adjustment mechanism. By doing this, the momentum of the main after air and the momentum of the sub-after air can be adjusted. The detailed air flow rate adjustment mechanism will be described later. When the momentum of the main after air is large excessively, the sub-after air amount is increased and when it is small excessively, the sub-after air amount is decreased. The sub-after air is jetted on the downstream side of the main after air ports 37, and air is supplied to the unburned components slipped between the main after air ports 37, so that CO can be reduced efficiently. On the other hand, the sub-after air has a small momentum and jetted air is mixed with unburned components at the low-temperature section on the downstream side, so that the generation of NOx (thermal NOx) is influenced little. Further, the main after air amount can be adjusted using the sub-after air, so that the secondary and tertiary air flow rates 76 supplied to the burners 52 can be always kept constant. This means that the burning condition of the flames of insufficient air formed by the burner section can be operated always under the optimum condition for minimizing the generation amount of NOx here. As a result, NOx generated in the burner section can be always kept at its minimum and the main after air jetting condition can be kept so that the overall performance of NOx and CO is optimized.

FIG. 19 is a schematic view of the boiler viewed from the front wall side of the furnace. The main after air ports 37 and sub-after air ports 38 are arranged in the same window box 1. If the window box 1 is shared, air supplied to the window box 1 can be adjusted by one valve, so that the control can be executed easily. One of the arrangement methods of the sub-after air ports 38 is that they are arranged on the downstream side of the main after air ports 37. The burners 52 are connected independently to the secondary and tertiary air supply ducts for the burners 54 and can individually control the air flow rate. On the flow path of the secondary and tertiary air supply ducts for the burners 54, a secondary and tertiary air flow rate adjustment mechanism 78 for the burners is installed and the amount of air flowing in the burners 52 is adjusted. Further, on the flow path for conveying pulverized coal, the pulverized coal flowmeter 73 is installed and is controlled to the secondary and tertiary air flow rate set values for the burners which are set by the controller 61 according to the pulverized coal flow rates 74 measured by the pulverized coal flowmeter 73.

Figure 20:
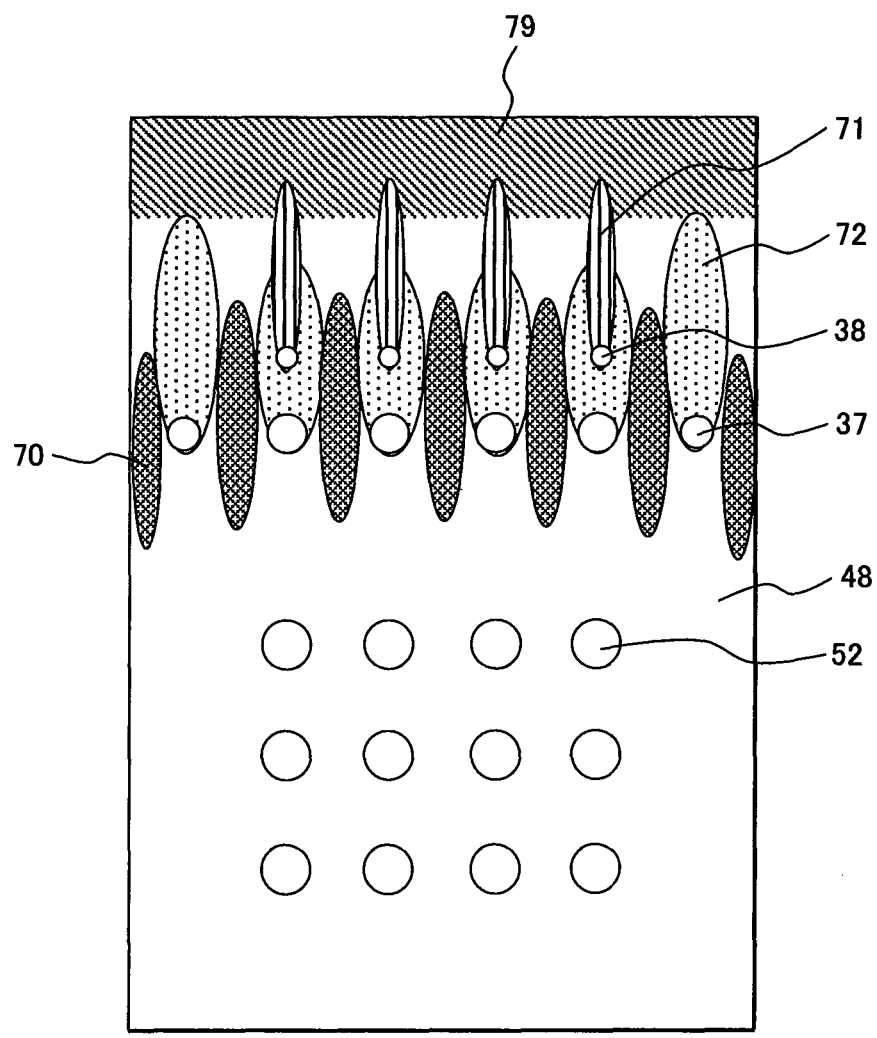
FIG. 20 is a drawing showing the gas mixture condition viewed from the front wall side of the furnace relating to the second embodiment of the present invention.
Figure 21:
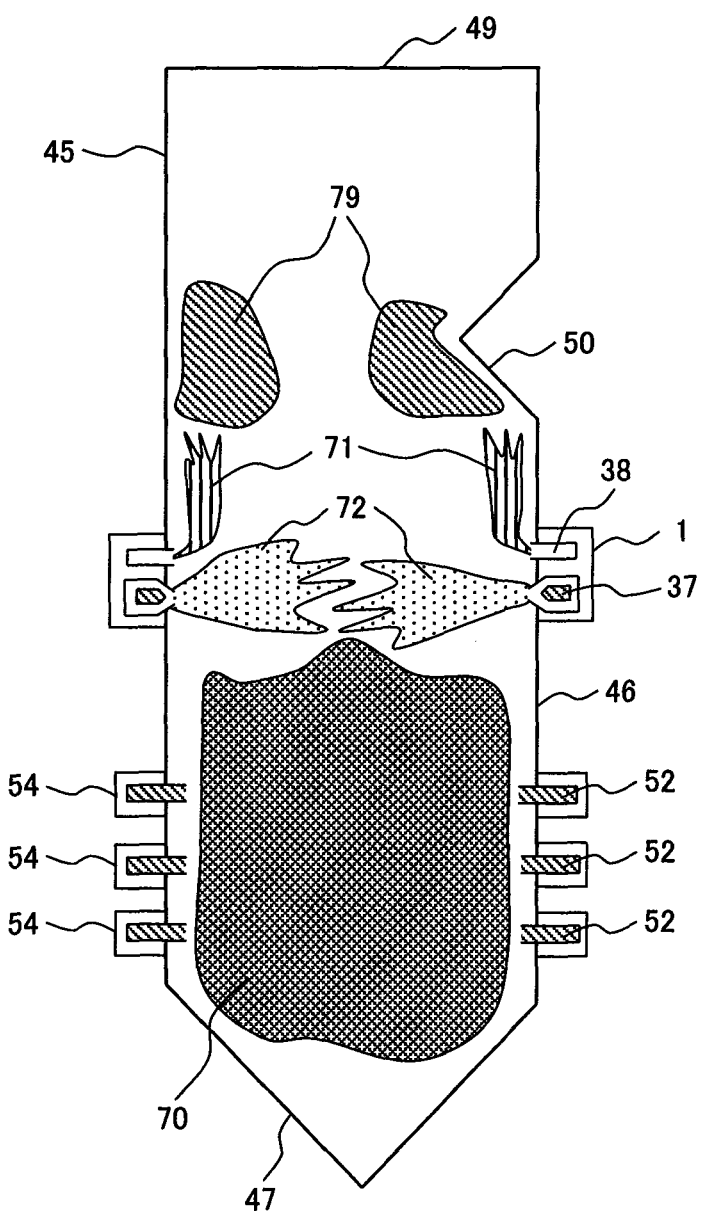
FIG. 21 is a drawing of the gas mixture condition of the pulverized coal-fired boiler relating to the second embodiment of the present invention.

The effects of the arrangement of the sub-after air ports on mixture of air with unburned components will be explained by referring to FIGS. 20 and 21. FIG. 20 shows the gas mixture condition in the neighborhood of the front wall of the boiler viewed from the front wall side of the furnace and FIG. 21 shows the gas mixture condition of the pulverized coal-fired boiler relating to the present invention. The unburned components 70 generated by the burners 52 are mixed and oxidized with air supplied from the main after air ports 37 on the downstream side, though a part of the unburned components 70 slips between the main after air ports 37 (FIG. 20). The sub-after air ports 38 are installed within the range from 1 to 5 times of the caliber of the main after air ports 37, thus air supplied from the sub-after air ports 38 can supply air to the neighborhood of the furnace wall where the unburned components 70 slipped between the main after air ports 37 are stagnant. Further, the sub-after air 71 has a small momentum, so that it is not mixed immediately with the unburned components 70 but is mixed in a low temperature region 79 on the downstream side of the furnace (FIG. 20, FIG. 21). By doing this, the generation of thermal NOx and the generation of CO can be suppressed simultaneously.

It is desirable to set the momentum of the main after air 72 to 3 to 20 times of the momentum of the sub-after air 71. For example, assuming the flow rate ratio of the main after air 72 to the sub-after air 71 as 3:1, the jet flow speed of the main after air 72 as 30 m/s, and the jet flow speed of the sub-after air 71 as 15 m/s, the momentum ratio becomes 10 times. In this case, the main after air 72 is supplied efficiently to the central part of the furnace and is mixed rapidly with the unburned components 70, so that CO can be reduced efficiently. Further, the sub-after air 71 is supplied efficiently to the neighborhood of the furnace wall, and in the low-temperature region 79 on the downstream side of the furnace, the unburned components 70 and the sub-after air 71 are mixed slowly, so that the generation of thermal NOx can be suppressed.

Figure 22:
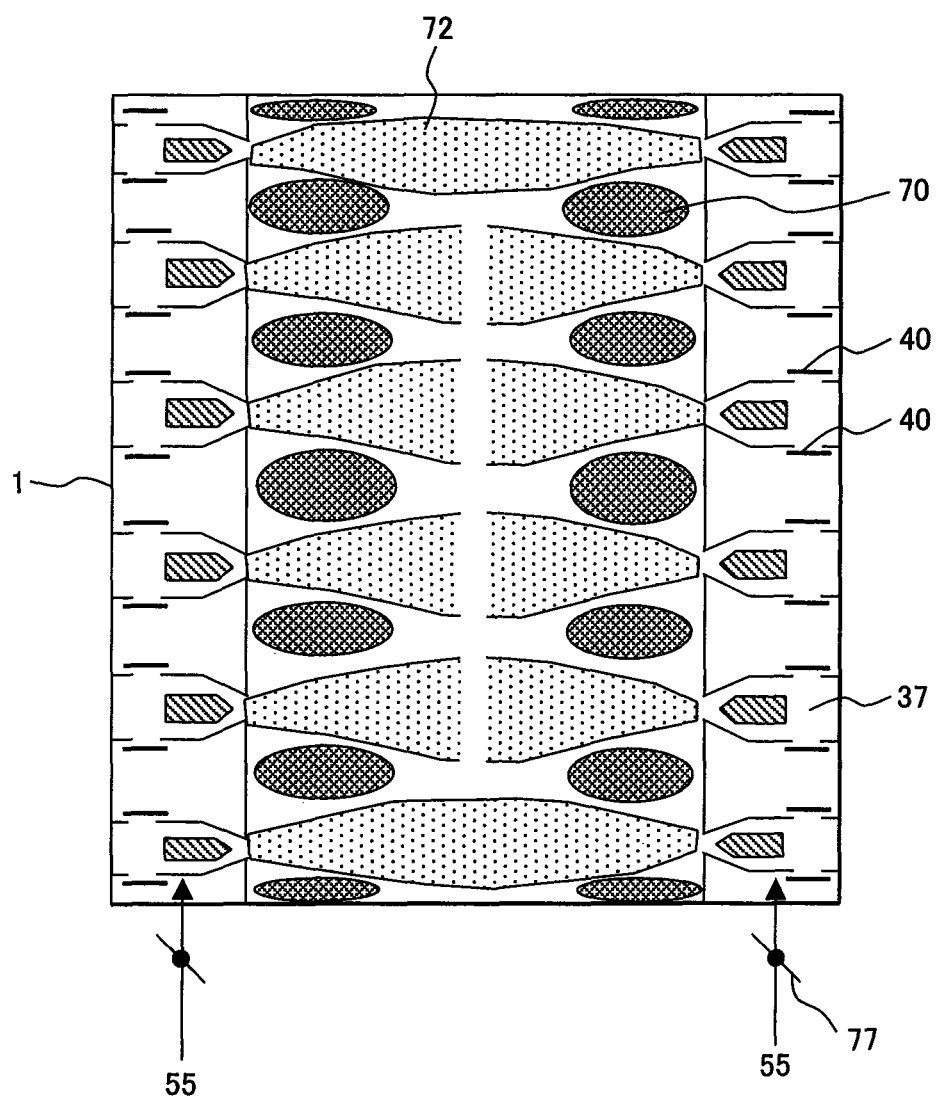
FIG. 22 is a cross sectional view of the line A-A shown in FIG. 19.

FIG. 22 shows the constitution of the main after air ports and the mixture condition of gas jetted from the main after air ports and it is a cross sectional view of the line A-A' shown in FIG. 18. A plurality of main after air ports 37 are generally arranged perpendicularly to the flow of combustion gas and the main after air ports of the same number are arranged respectively on the side of the front wall 45 of the furnace and on the side of the back wall 46 of the furnace. Although not drawn, on the downstream side, the sub-after air ports 38 are arranged in the same window box 1 as that of the main after air ports 37. With respect to air supplied to the main after air ports 37, the air amount is adjusted by the after air flow rate adjustment mechanism 77 and furthermore, the air amount flowing in each flow path is adjusted by the main after air flow rate adjustment mechanism 40.

The main after air ports 37 are arranged so that the caliber on the side wall side of the furnace is smaller than that on the central side thereof. If the caliber of the main after air 72 on the side wall side is made smaller and the momentum is increased, the jet can reach the central part of the furnace, so that air can be supplied efficiently to the unburned components 70 slipping through the neighborhood of the central part of the furnace.

Figure 23:
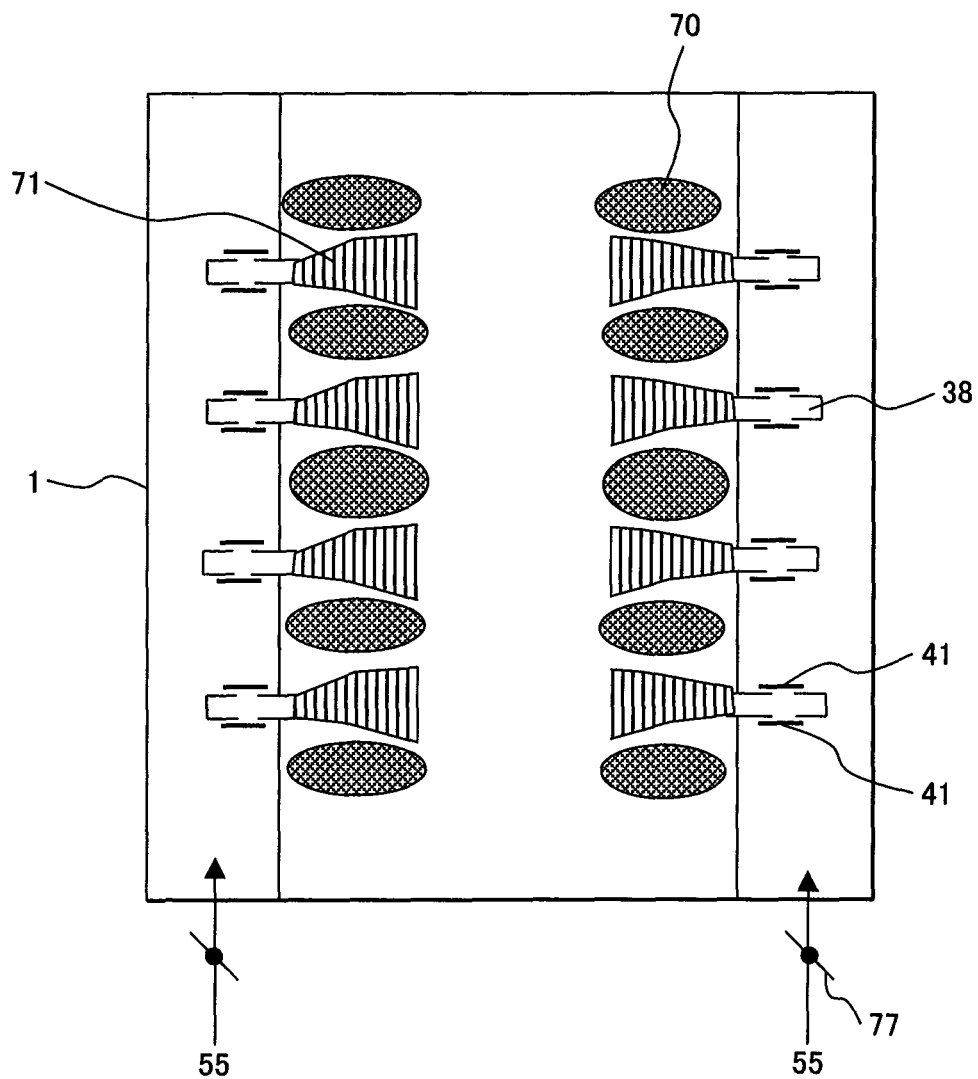
FIG. 23 is a cross sectional view of the line B-B shown in FIG. 19.

FIG. 23 shows the constitution of the sub-after air ports and the mixture condition of gas jetted from the sub-after air ports and it is a cross sectional view of the line B-B' shown in FIG. 18. A plurality of sub-after air ports 38 are generally arranged perpendicularly to the flow of combustion gas and the sub-after air ports of the same number are arranged respectively on the side of the front wall 45 of the furnace and on the side of the back wall 46 of the furnace. Although not drawn, on the upstream side, the main after air ports 37 are arranged in the same window box 1 as that of the sub-after air ports 38. With respect to air supplied to the sub-after air ports 38, the air amount is adjusted by the after air flow rate adjustment mechanism 77 and furthermore, the air amount flowing in each flow path is adjusted by the sub-after air flow rate adjustment mechanism 41. The sub-after air 71 makes the momentum smaller and supplies air to the unburned components 70 slipping between the main after air ports 37. By doing this, the sub-after air 71 is not mixed with the unburned components 70 in the region at a high gas temperature but is mixed in the downstream region at a low temperature.

Figure 24:
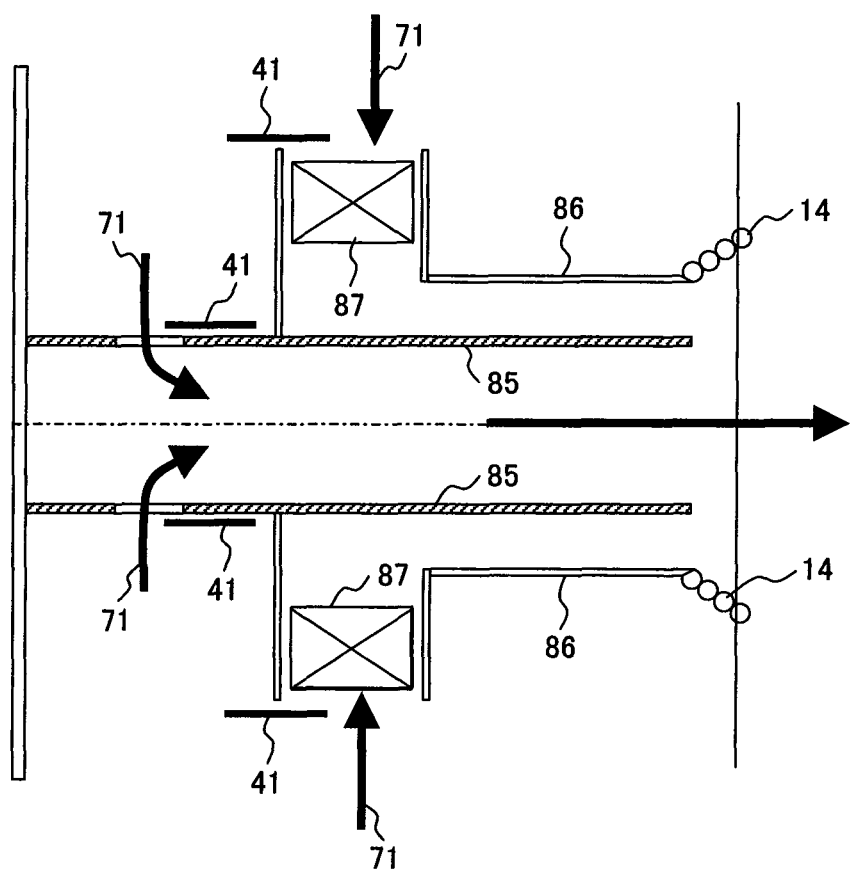
FIG. 24 is a cross sectional view showing another embodiment of the sub-after air ports in the second embodiment.

FIG. 24 shows an example of the air port structure of the sub-after air ports. The sub-after air ports 38 have a multi-circular tube structure on the concentric axis. The ports are structured so as to jet a straight flow from a circular tube 85 at the central part and jet a rotational flow from an outer periphery 86 by a resistor 87. The flow rate of the sub-after air 71 can be adjusted by the sub-after air flow rate adjustment mechanism 41. If the sub-after air ports 38 are formed as a composite port composed of a multi-tube for jetting a straight flow and a rotational flow, adjustment of the penetration force (prevention of slipping of unburned gas through the furnace center) and promotion of mixture of unburned gas between the main after air ports 37 (effect of the rotational flow) can be expected.

Embodiment 11

Figure 25:
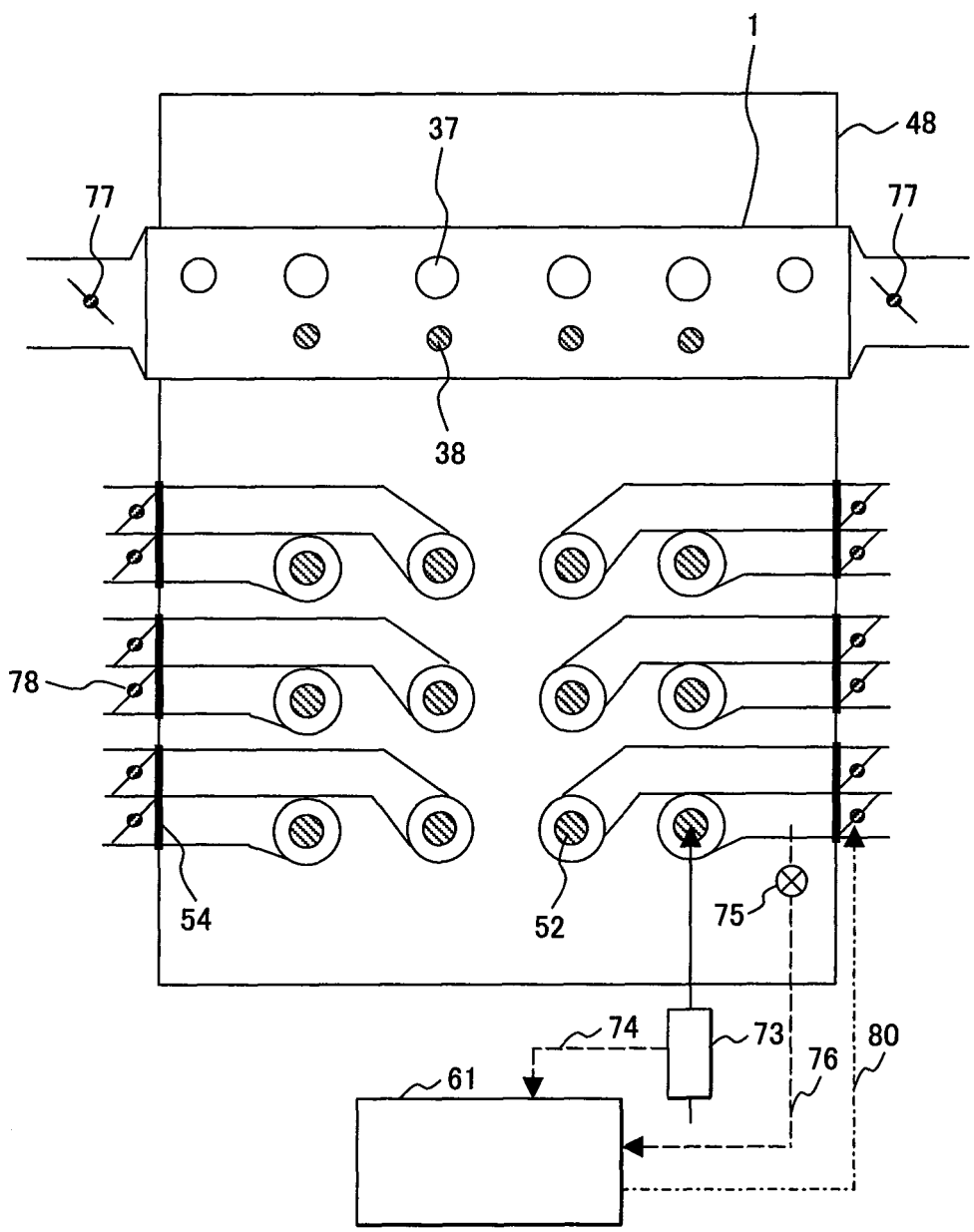
FIG. 25 is a schematic view of the boiler viewed from the front wall side of the furnace relating to a third embodiment of the present invention.
Figure 26:
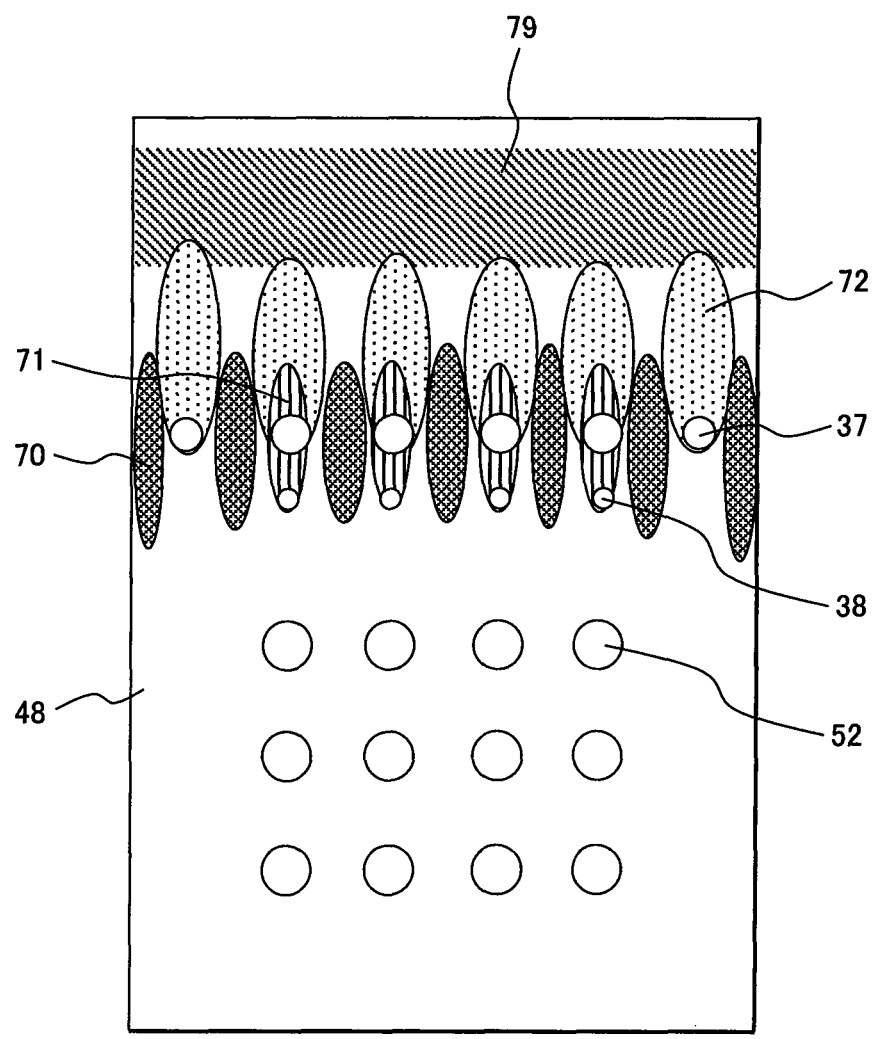
FIG. 26 is a drawing showing the gas mixture condition viewed from the front wall side of the furnace relating to the third embodiment of the present invention.

In this embodiment, the case that the arrangement of the sub-after air ports is changed will be explained by referring to FIGS. 25 and 26. FIG. 25 shows a modified example of the arrangement of the sub-after air ports 38 and is a schematic view of the boiler viewed from the front wall side of the furnace. FIG. 26 is a schematic view of the boiler viewed from the front wall side of the furnace and is a drawing showing the gas mixture condition in the neighborhood of the front wall. The main after air ports 37 and sub-after air ports 38 are arranged in the same window box 1. The sub-after air ports 38 are arranged on the upstream side of the main after air ports 37. If the sub-after air ports 38 are arranged like this, by the sub-after air 71 supplied from the sub-after air ports 38, the combustion gas flow from the upstream side of the furnace is stagnated. Therefore, the flow of the main after air 72 supplied from the main after air ports 37 is not disturbed by combustion gas in the neighborhood of the furnace wall and can be supplied to the center of the furnace. On the other hand, the sub-after air 71 has a small momentum and can supply air to the stagnant region of combustion gas generated in the neighborhood of the furnace wall, so that the mixture with the unburned components 70 is promoted. By doing this, air can be mixed efficiently with the unburned components 70 remaining between the main after air ports 37.

Embodiment 12

Figure 27:
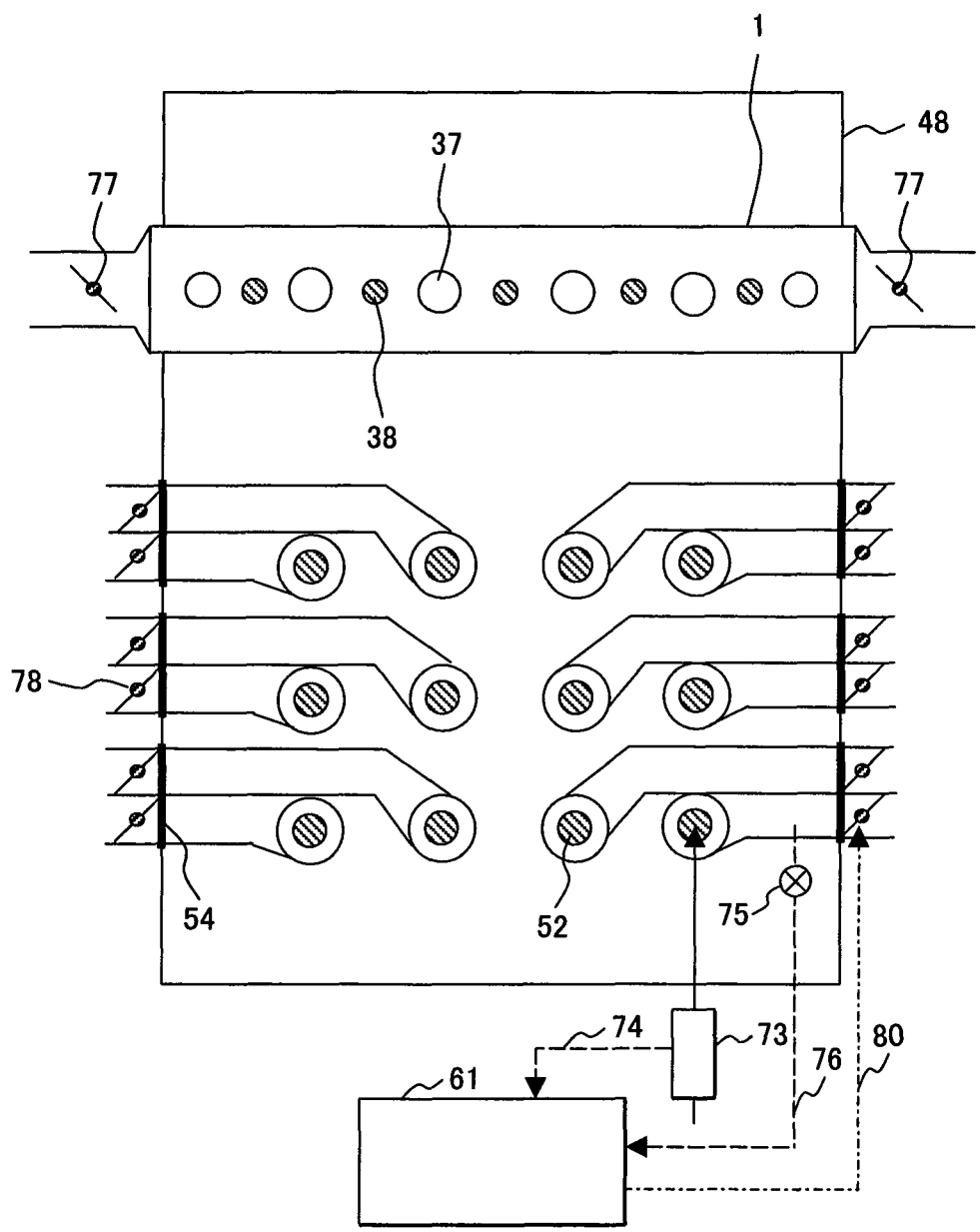
FIG. 27 is a schematic view of the boiler viewed from the front wall side of the furnace relating to the first embodiment of the present invention.
Figure 28:
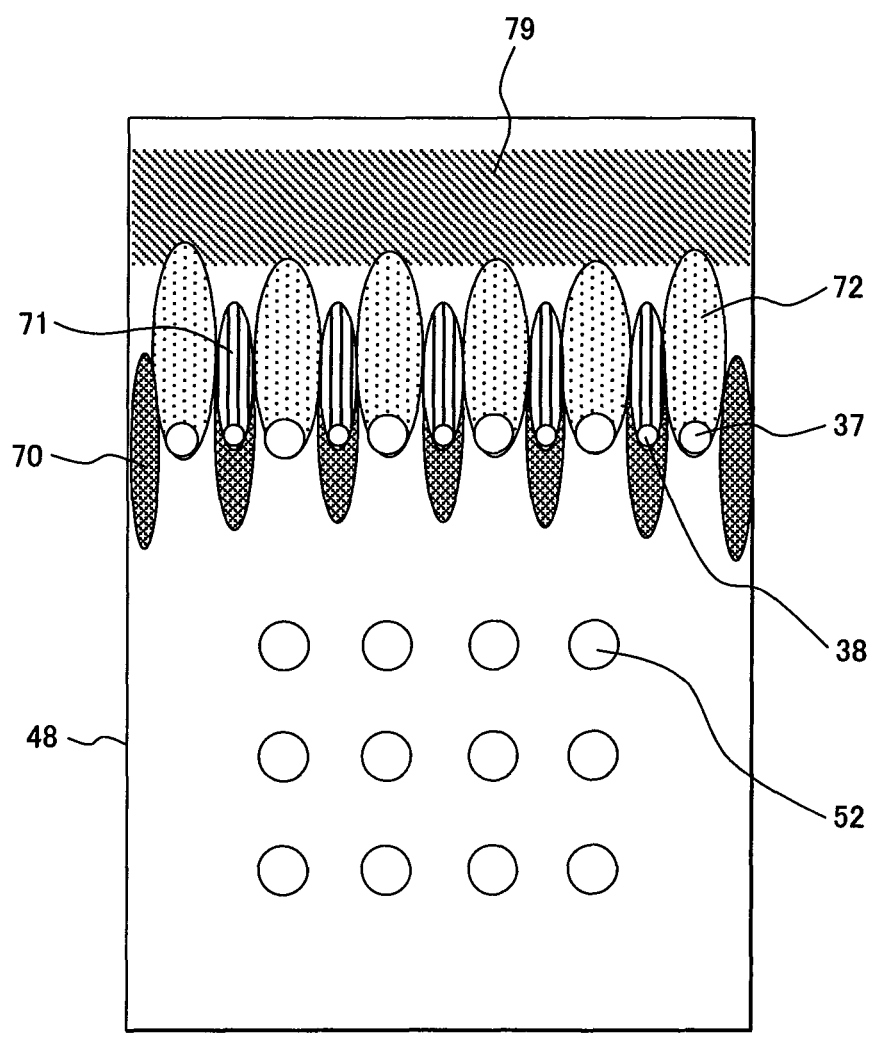
FIG. 28 is a drawing showing the gas mixture condition viewed from the front wall side of the furnace relating to the first embodiment of the present invention.

In this embodiment, the case that the arrangement of the sub-after air ports is changed will be explained by referring to FIGS. 27 and 28. FIG. 27 shows a modified example of the arrangement of the sub-after air ports 38 and is a schematic view of the boiler viewed from the front wall side of the furnace. FIG. 28 is a schematic view of the boiler viewed from the front wall side of the furnace and is a drawing showing the gas mixture condition in the neighborhood of the front wall. The main after air ports 37 and sub-after air ports 38 are arranged in the same window box 1. The sub-after air ports 38 are arranged alternately between the main after air ports 37. If the sub-after air ports 38 are arranged like this, the sub-after air 71 is jetted from between the main after air ports 37, so that it can be mixed directly with the unburned components 70 slipping between the main after air ports 37, thus CO can be reduced efficiently. Here, if the momentum of the sub-after air 71 is increased, it is mixed quickly with the unburned components 70 and the temperature rises, so that thermal NOx is generated. Therefore, the sub-after air 71 must be jetted in particular consideration of the momentum. If the momentum of the sub-after air 71 is made smaller, even if the sub-after air ports 38 are arranged between the main after air ports 37, by suppressing generation of thermal NOx, it can be mixed efficiently with the unburned components 70 remaining between the main after air ports 37.

Embodiment 13

Figure 29:
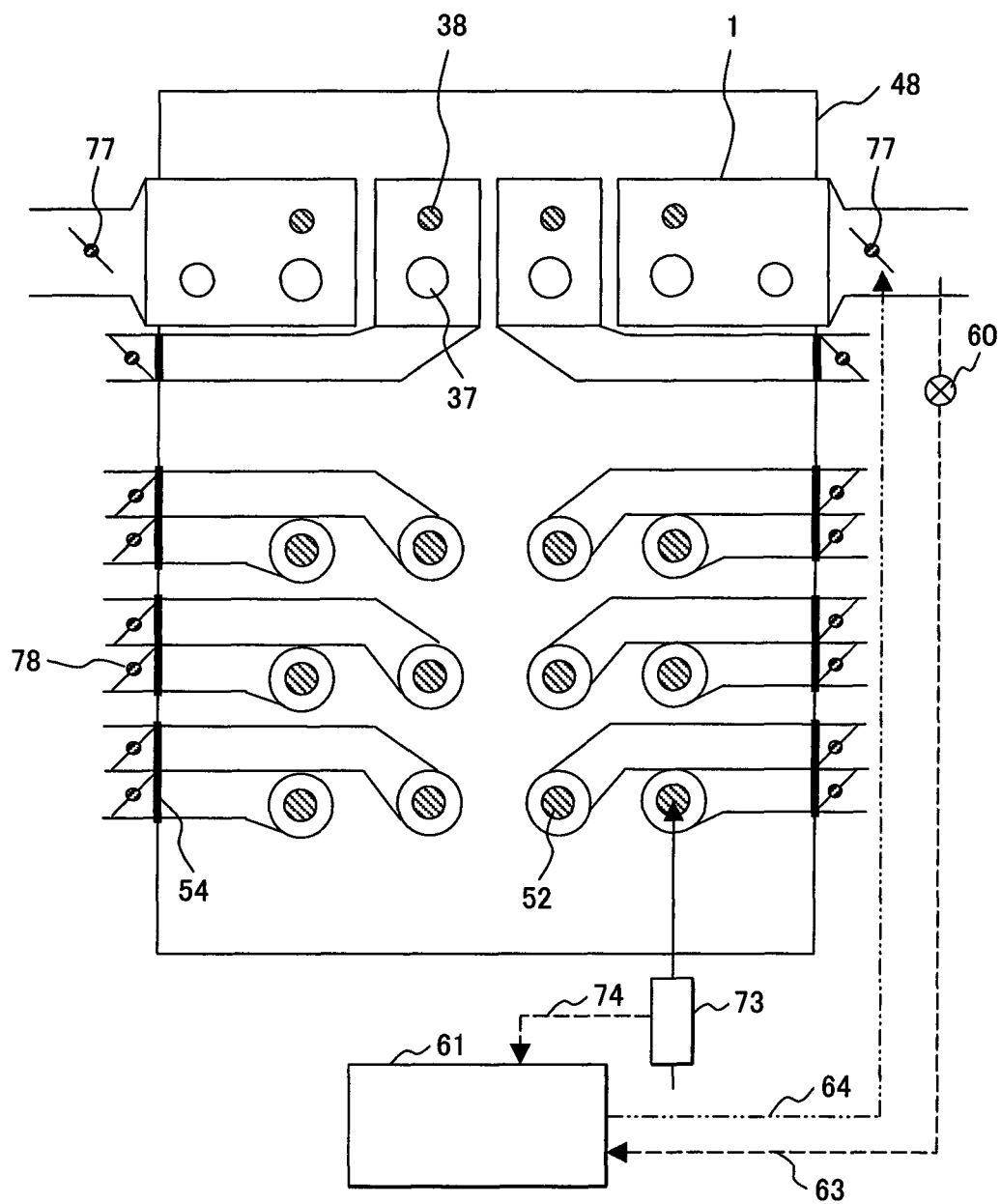
FIG. 29 is a schematic view of the boiler viewed from the front wall side of the furnace relating to the second embodiment of the present invention.

In this embodiment, the constitution in which the air flow rate control method of the after air ports is changed will be explained by referring to FIG. 29. FIG. 29 shows a modified example of the arrangement of the window box 1 and is a schematic view of the boiler viewed from the front wall side of the furnace. At least a set of main after air port 37 and a sub-after air port 38 is arranged in the same window box 1. By doing this, without changing the ratio of the momentum between the main after air 72 and the sub-after air 71, the after air flow rates jetted at the central part of the furnace and the side wall of the furnace can be adjusted. One of the arrangement methods of the sub-after air ports 38 is that they are arranged on the downstream side of the main after air ports 37. The window box 1 is connected to the after air supply duct and can control individually the air flow rate. On the flow path of the after air supply duct, the after air flow rate adjustment mechanism 77 is installed and the amount of air flowing in the main after air ports 37 and sub-after air ports 38 is adjusted. To the burners 52, the secondary and tertiary air supply ducts for the burners 54 are connected independently and the air flow rate can be controlled individually. On the flow path of the secondary and tertiary air supply ducts for the burners 54, the secondary and tertiary air flow rate adjustment mechanism for the burners 78 is installed and the amount of air flowing in the burners 52 is adjusted. Further, on the flow path for conveying pulverized coal, the pulverized coal flowmeter 73 is installed and according to the pulverized coal flow rate 74 measured by the pulverized coal flowmeter 73, the flow rate is controlled to the after air flow rate set value which is set by the controller 61.

Embodiment 14

In this embodiment, the air flow rate control method of the after air ports will be explained.

Figure 31:
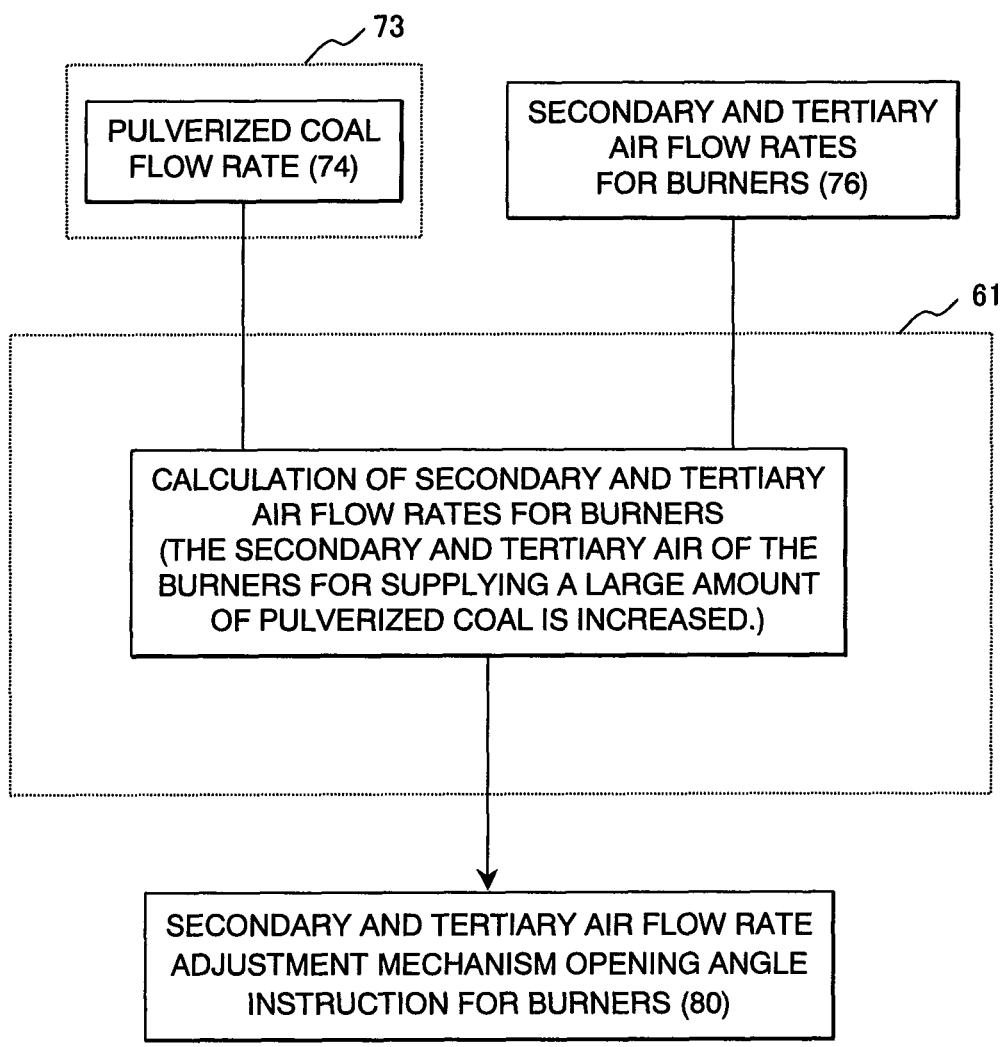
FIG. 31 is a block diagram showing a control example of the secondary and tertiary air flow rate for the burners which is executed by the controller.
Figure 32:
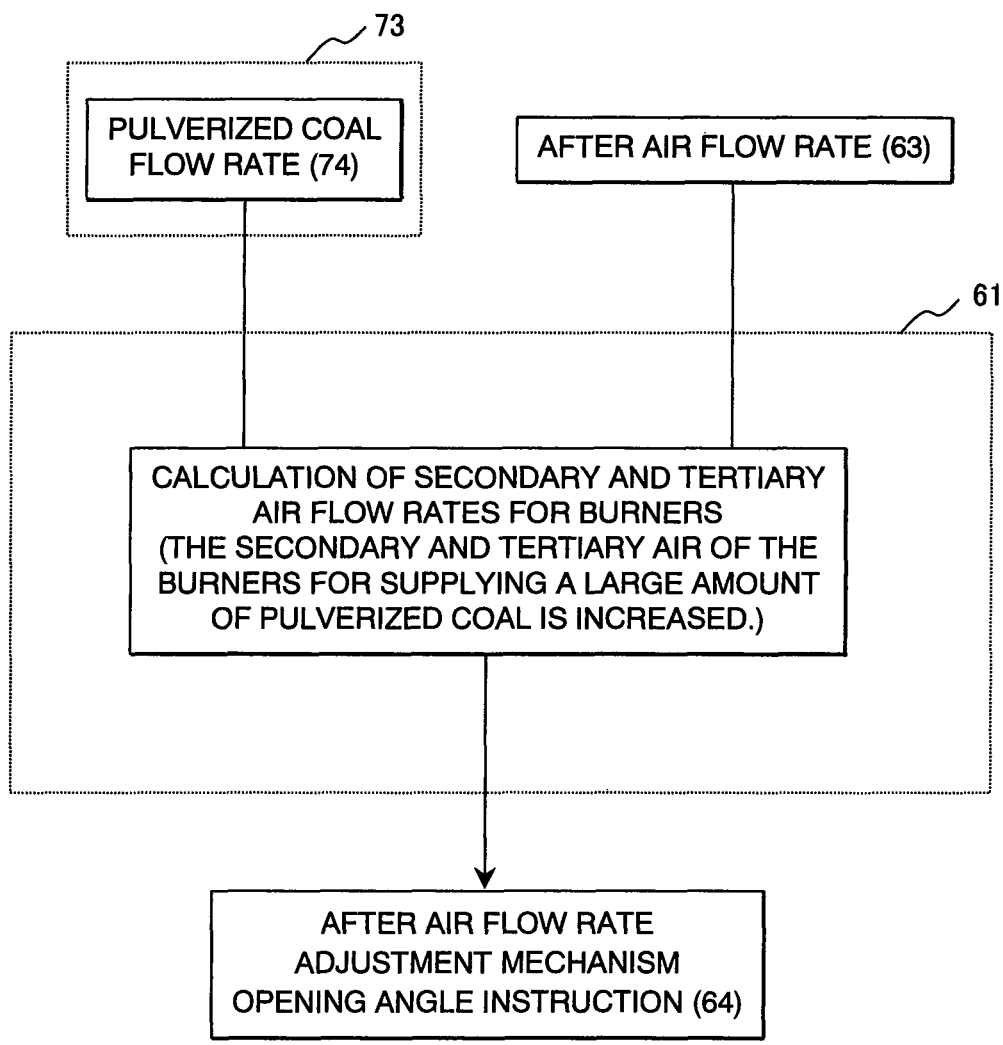
FIG. 32 is another block diagram showing a control example of the after air flow rate which is executed by the controller.

The concerned control method will be explained by referring to FIGS. 19 and 31. The pulverized coal flow rate 74 supplied from the mill is measured by the pulverized coal flowmeter 73 and a signal is input to the controller 61. Further, the secondary and tertiary air flow rates for the burners 76 are measured by the secondary and tertiary air flow rate detector for the burners 75 and a signal is input to the controller 61. The controller 61 judges always the pulverized coal flow rate 74 supplied to the burners and the secondary and tertiary air flow rates for the burners 76 are calculated. By a signal from the controller 61, a secondary and tertiary air flow rate adjustment mechanism opening angle instruction 80 is sent to the secondary and tertiary air flow rate adjustment mechanism 78 and the secondary and tertiary air flow rates for the burners 76 jetted to the intra-furnace combustion space 23 is controlled. When there is a place of a large supply amount of pulverized coal on the front wall side of the furnace, it is possible to increase the secondary and tertiary air flow rates for the burners 76 on the front wall of the furnace and decrease the secondary and tertiary air flow rates for the burners 76 on the back wall thereof. Further, when there is a place of a large supply amount of pulverized coal on the side wall of the furnace, it is possible to increase the secondary and tertiary air flow rates for the burners 76 on the side wall of the furnace and decrease the secondary and tertiary air flow rates for the burners 76 at the central part of the furnace. By use of this control method, according to the pulverized coal flow rate supplied to each burner, the secondary and tertiary air flow rates for the burners 76 can be controlled and air can be supplied to the unburned components 70 generated on the upstream side of the furnace, so that CO can be reduced effectively.

Next, the concerned control method will be explained by referring to FIGS. 29 and 31. The pulverized coal flow rate 74 supplied from the mill is measured by the pulverized coal flowmeter 73 and a signal is input to the controller 61. Further, the after air flow rate 63 is measured by the after air flow rate detector 60 and a signal is input to the controller 61. The controller 61 judges always the pulverized coal flow rate 74 supplied to the burners and the after air flow rate 63 are calculated. By a signal from the controller 61, the after air flow rate adjustment mechanism opening angle instruction 64 is sent to the after air flow rate adjustment mechanism 77 and the after air flow rate 63 jetted to the intra-furnace combustion space 23 is controlled. When there is a place of a large supply amount of pulverized coal on the front wall side of the furnace, it is possible to increase the after air flow rate 63 on the front wall of the furnace and decrease the after air flow rate 63 on the back wall side thereof. Further, when there is a place of a large supply amount of pulverized coal on the side wall of the furnace, it is possible to increase the after air flow rate 63 on the side wall of the furnace and decrease the after air flow rate 63 at the central part of the furnace. By use of this control method, according to the pulverized coal flow rate supplied to each burner, the after air flow rate 63 can be controlled and by keeping the combustion condition under which the generation amount of NOx by the burners is minimized, air can be supplied to the unburned components 70 generated on the upstream side of the furnace, so that NOx and CO can be reduced effectively.

Figure 30:
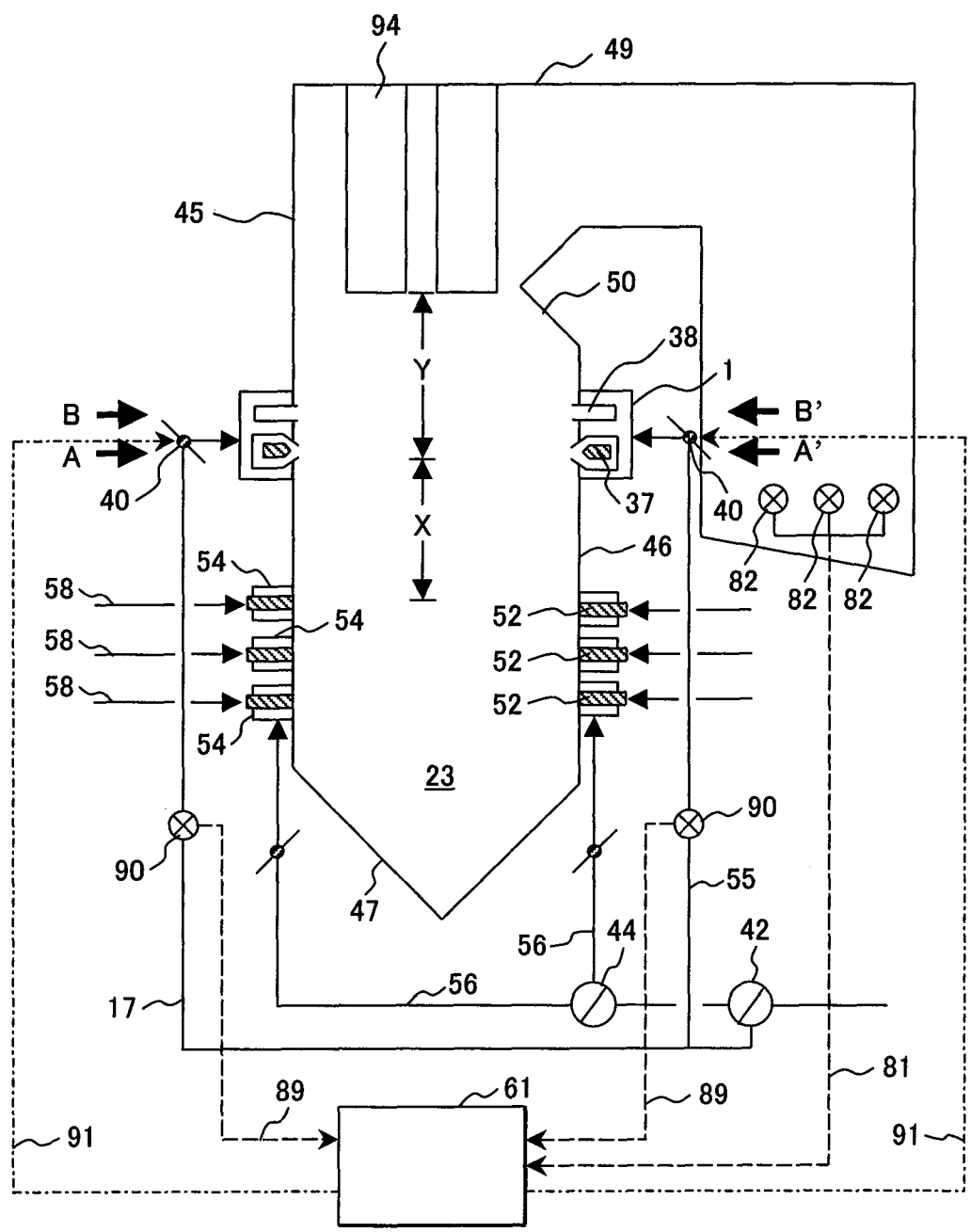
FIG. 30 is a schematic constitution of a pulverized coal boiler and a supply system of air and pulverized coal thereof relating to the third embodiment of the present invention.
Figure 33:
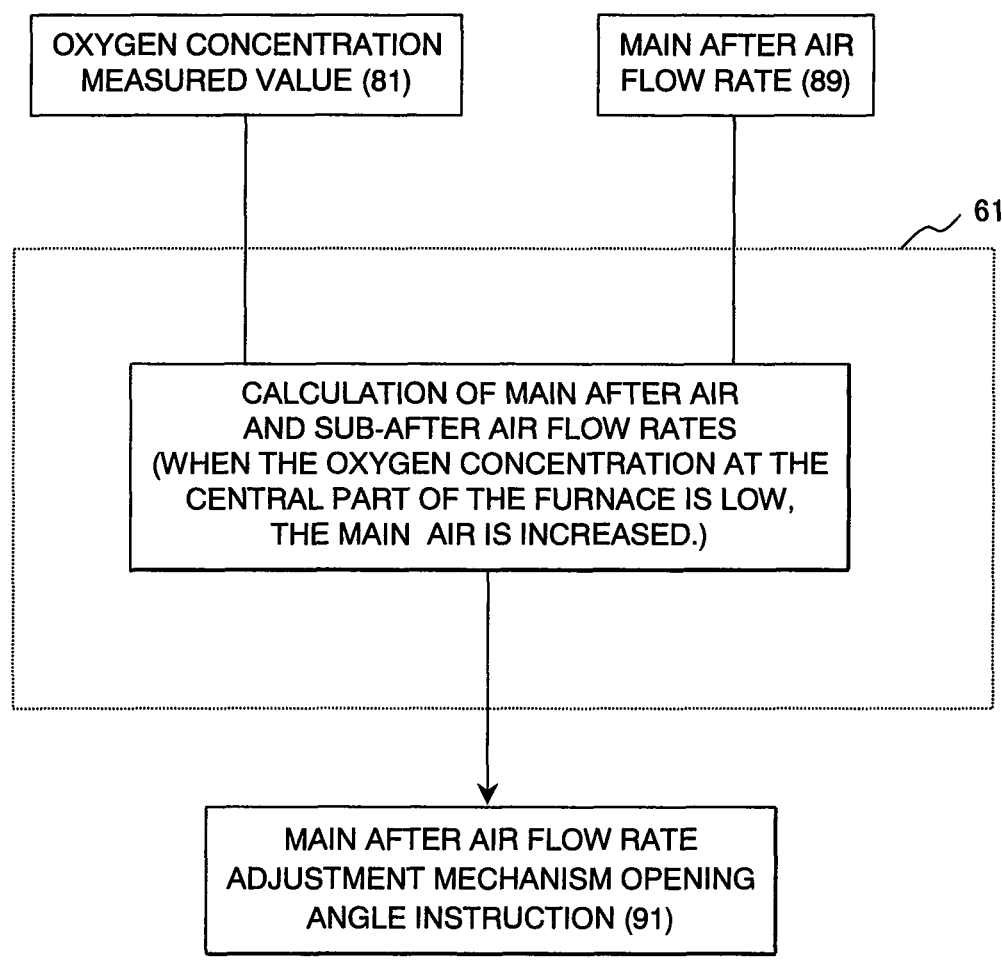
FIG. 33 is a block diagram showing a control example of the main after air flow rate which is executed by the controller.

Further, the concerned control method will be explained by referring to FIGS. 30 and 33. An oxygen concentration measured value of combustion gas 81 is measured by an oxygen concentration detector 82 installed on the downstream side of the back heat transfer section and a signal is input to the controller 61. Further, a main after air flow rate 89 is measured by a main after air flow rate detector 90 and a signal is input to the controller 61. The controller 61 always judges the air amount of the after air ports installed on the upstream side of the place of a low oxygen concentration and calculates the air amounts of the main after air ports 37 and sub-after air ports 38, thus the main after air flow rate 89 is decided. By a signal from the controller 61, a main after air flow rate adjustment mechanism opening angle instruction 91 is sent to the main after air flow rate adjustment mechanism 40 and the after air flow rate jetted to the intra-furnace combustion space 23 is controlled. When there is a place of a low oxygen concentration at the center of the furnace, it is possible to increase the after air flow rate of the main after air ports 37 and adjust the sub-after air flow rate. Inversely, when there is a place of a low oxygen concentration in the neighborhood of the wall of the furnace, it is possible to decrease the air flow rate of the main after air ports 37 and adjust the sub-after air flow rate. By use of this control method, according to the oxygen concentration at the exit, the main after air flow rate and sub-after air flow rate can be controlled and air can be supplied efficiently to unburned gas, so that NOx and CO can be reduced effectively.

The invention claimed is:

1. A pulverized coal-fired boiler comprising:
a furnace composing a pulverized coal-fired boiler,
a plurality of burners arranged on an upstream side of a wall face of the furnace for supplying and burning pulverized coal of fuel and air in the furnace,
a plurality of after air ports for supplying air arranged on a down stream side of the wall face of the furnace installed above an installation position of the burners, and
main after air ports for supplying a large amount of air and sub-after air ports for supplying a small amount of air installed in the plurality of the after air ports, wherein:
the sub-after air ports are arranged at a position of the wall face of the furnace on a downstream side of the main after airports and right above the main after airports, or
the sub-after airports are arranged at a position of the wall face of the furnace on an upstream side of the main after air ports and right below the main after air ports, and
a sectional center of each of the sub-after air ports is within a range from 1 to 5 times of a caliber of the main after air ports from a sectional center of each of the main after air ports,
wherein a set of one of the main after air ports and one of the sub-after air ports is made, and at least one set thereof is connected to the same window box, and a plurality of the window boxes are installed side by side on the wall face of the furnace in one direction, and an air flow rate adjustment mechanism is installed on an after air supply duct for supplying after air, and the air flow rate adjustment mechanism is arranged in secondary and tertiary air supply ducts for supplying secondary and tertiary air for combustion to the burners so as to independently supply air to the burners,
wherein a pulverized coal flowmeter for measuring a pulverized coal amount of fuel conveyed to a plurality of burners is installed in a flow path for conveying pulverized coal to the burners and a controller for adjusting secondary and tertiary air amounts for combustion to be supplied to the burners on the basis of the pulverized coal amount measured by the pulverized coal flowmeter, is installed.

2. A pulverized coal-fired boiler comprising:

a furnace composing a pulverized coal-fired boiler, a plurality of burners arranged on an upstream side of a wall face of the furnace for supplying and burning pulverized coal of fuel and air in the furnace, a plurality of after air ports for supplying air arranged on a down stream side of the wall face of the furnace installed above an installation position of the burners, and main after air ports for supplying a large amount of air and sub-after air ports for supplying a small amount of air installed in the plurality of the after air ports, wherein:

the sub-after air ports are arranged at a position of the wall face of the furnace on a downstream side of the main after airports and right above the main after airports, or the sub-after airports are arranged at a position of the wall face of the furnace on an upstream side of the main after air ports and right below the main after air ports, and a sectional center of each of the sub-after air ports is within a range from 1 to 5 times of a caliber of the main after air ports from a sectional center of each of the main after air ports, wherein a set of one of the main after air ports and one of the sub-after air ports is made, and at least one set thereof is connected to the same window box, and a plurality of the window boxes are installed side by side on the wall face of the furnace in one direction, and an air flow rate adjustment mechanism is installed on an after air supply duct for supplying after air, and the air flow rate adjustment mechanism is arranged in secondary and tertiary air supply ducts for supplying secondary and tertiary air for combustion to the burners so as to independently supply air to the burners, wherein a pulverized coal flowmeter for measuring a pulverized coal amount of fuel conveyed to a plurality of burners is installed in a flow path for conveying pulverized coal to the burners and a controller is provided for adjusting after air amounts to be supplied to the main and sub-after air ports on the basis of the pulverized coal amount measured by the pulverized coal flowmeter.

* * * * *